United States Patent
Xu et al.

(10) Patent No.: US 10,068,247 B2
(45) Date of Patent: Sep. 4, 2018

(54) PACING CONTROL FOR ONLINE AD CAMPAIGNS

(71) Applicant: Excalibur IP, LLC, New York, NY (US)

(72) Inventors: Jian Xu, Beijing (CN); Kuang-chih Lee, Union city, CA (US); Wentong Li, Saratoga, CA (US); Hang Qi, San Jose, CA (US); Quan Lu, San Diego, CA (US)

(73) Assignee: Excalibur IP, LLC, New York, NY (US)

( * ) Notice: Subject to any disclaimer, the term of this patent is extended or adjusted under 35 U.S.C. 154(b) by 766 days.

(21) Appl. No.: 14/573,979

(22) Filed: Dec. 17, 2014

(65) Prior Publication Data
US 2016/0180373 A1 Jun. 23, 2016

(51) Int. Cl.
*G06Q 30/02* (2012.01)

(52) U.S. Cl.
CPC ..... *G06Q 30/0244* (2013.01); *G06Q 30/0272* (2013.01)

(58) Field of Classification Search
CPC .................................. G06Q 30/0207–30/0277
See application file for complete search history.

(56) References Cited

U.S. PATENT DOCUMENTS

| | | | | |
|---|---|---|---|---|
| 7,908,238 B1 * | 3/2011 | Nolet | ..................... | G06N 7/005 706/52 |
| 8,781,875 B2 * | 7/2014 | Chatter | .................. | G06Q 30/00 705/26.1 |
| 9,715,699 B1 * | 7/2017 | Els | ..................... | G06Q 30/0275 |
| 2006/0224496 A1 * | 10/2006 | Sandholm | .............. | G06Q 30/02 705/37 |
| 2007/0067215 A1 * | 3/2007 | Agarwal | ................ | G06Q 30/02 705/14.69 |
| 2010/0057534 A1 * | 3/2010 | Gershkoff | .............. | G06Q 30/02 705/7.33 |
| 2010/0250332 A1 | 9/2010 | Ghosh et al. | | |

(Continued)

OTHER PUBLICATIONS

Real-Time Bidding Algorithms for Performance Based Display Ad Allocation, Chen et al., KDD'11, Aug. 21-24, 2011.*

(Continued)

*Primary Examiner* — David J Stoltenberg
(74) *Attorney, Agent, or Firm* — Brinks Gilson & Lione

(57) ABSTRACT

Described herein are techniques and systems for online ad campaign pacing. The techniques described herein use budget allocation along with the estimations of bids and response rates. With use of budget allocation, the techniques can use budget pacing to enhance impressions and maximize desired responses, such as desired click-through rates. These techniques focus on enhancing pacing and performance of ad campaigns, such as enhancing performance across distinct and/or unified online ad marketplaces. These techniques are especially useful in the context of a demand-side platform (DSP). In some examples, the techniques assume that impression supply is much larger than advertiser demand for impressions of their ads, so such techniques focus on selecting high performing inventory of ad space. Yet, with such a focus, a smooth or consistent delivery of ads over time is used.

15 Claims, 9 Drawing Sheets

(56) References Cited

U.S. PATENT DOCUMENTS

| | | | | |
|---|---|---|---|---|
| 2010/0262455 | A1* | 10/2010 | Karlsson | G06Q 30/02 705/14.45 |
| 2011/0040611 | A1* | 2/2011 | Simmons | G06Q 30/02 705/14.41 |
| 2011/0040613 | A1* | 2/2011 | Simmons | G06Q 30/02 705/14.42 |
| 2011/0040635 | A1* | 2/2011 | Simmons | G06Q 30/02 705/14.71 |
| 2012/0041816 | A1* | 2/2012 | Buchalter | G06Q 30/02 705/14.41 |
| 2012/0158456 | A1* | 6/2012 | Wang | G06Q 30/0202 705/7.31 |
| 2013/0238425 | A1* | 9/2013 | Saldanha | G06Q 30/02 705/14.48 |
| 2014/0006141 | A1* | 1/2014 | Vassilvitskii | G06Q 30/0241 705/14.45 |
| 2014/0046777 | A1* | 2/2014 | Markey | G06Q 30/0269 705/14.66 |
| 2014/0058827 | A1* | 2/2014 | Svirsky | G06Q 30/02 705/14.43 |
| 2014/0278981 | A1* | 9/2014 | Mersov | G06Q 30/02 705/14.53 |
| 2015/0073920 | A1* | 3/2015 | Pashkevich | G06Q 30/0275 705/14.71 |
| 2015/0112795 | A1* | 4/2015 | Jalali | G06Q 30/0249 705/14.48 |
| 2015/0134462 | A1* | 5/2015 | Jalali | G06Q 30/0275 705/14.71 |
| 2015/0134463 | A1* | 5/2015 | Jalali | G06Q 30/0275 705/14.71 |
| 2015/0170222 | A1* | 6/2015 | Els | G06Q 30/0275 705/14.71 |
| 2015/0332349 | A1* | 11/2015 | Els | G06Q 30/0275 705/14.71 |
| 2015/0363820 | A1* | 12/2015 | Leitersdorf | G06Q 10/04 705/14.41 |
| 2016/0042407 | A1* | 2/2016 | Els | G06Q 30/0275 705/14.71 |
| 2016/0110755 | A1* | 4/2016 | Smirnov | G06Q 30/0244 705/14.43 |

OTHER PUBLICATIONS

Optimal Real-Time Bidding for Display Advertising, Zhang, et al., KDD'14, Aug. 24-27, 2014.*

A. Ghosh, P. McAfee, K. Papineni and S. Vassilvitskii, "Bidding for Representative Allocations for Display Advertising", Internet and Economics, 12pgs., 2009.

A. Ghosh, B. Rubenstein, S. Vassilvitskii and M. Zinkevich, "Adaptive Bidding for Display Advertising", Proc. 18th ACM International World Wide Web Conference (WWW), 10pgs., 2009.

N. Karlsson and J. Zhang, "Applications of Feedback Control in Online Advertising", 6pgs., 2013 American Control Conference (ACC).

http://en.wikipedia.org/wiki/PID_controller, 17pgs., (retrieved on Oct. 20, 2014).

D. Agarwal, R. Agrawal, and R. Khanna. Estimating rates of rare events with multiple hierarchies through scalable log-linear models. ACM SIGKDD Conf. on Knowledge Discovery and Data Mining, 2010.

D. Agarwal, A. Broder, D. Chakrabarti, D. Diklic, V. Josifovski, and M. Sayyadian. Estimating rates of rare events at multiple resolutions. ACM SIGKDD Conf. on Knowledge Discovery and Data Mining, 2007.

O. Chapelle, E. Manavoglu, and R. Rosales. Simple and scalable response prediction for display advertising. ACM Transactions on Intelligent Systems and Technology, 2014.

T. Graepel, J. Q. Candela, T. Borchert, and R. Herbrich. Web-Scale Bayesian Click-Through Rate Prediction for Sponsored Search Advertising in Microsoft's Bing Search Engine. The 27th International Conference on Machine Learning, 2010.

B. Kanagal, A. Ahmed, S. Pandey, V. Josifovski, L. Garcia-Pueyo, and J. Yuan. Focused Matrix Factorization for Audience Selection in Display Advertising. 29th IEEE International Conference on Data Engineering, 2013.

K.-C. Lee, A. Jalali, and A. Dasdan. Real Time Bid Optimization with Smooth Budget Delivery in Online Advertising. The Seventh International Workshop on Data Mining for Online Advertising, 2013.

K.-C. Lee, B. Orten, A. Dasdan, and W. Li. Estimating Conversion rate in Display Advertising from Past Performance Data. ACM SIGKDD Conf. on Knowledge Discovery and Data Mining, 2012.

H. McMahan, G. Holt, D. Sculley, M. Young, D. Ebner, J. Grady, L. Nie, T. Phillips, E. Davydov, D. Golovin, S. Chikkerur, D. Liu, M. Wattenberg, A. Hrafnkelsson, T. Boulos, and J. Kubica. Ad Click Prediction: a View from the Trenches. ACM SIGKDD Conf. on Knowledge Discovery and Data Mining, 2013.

C. Perlich and B. Dalessandro. Bid Optimizing and Inventory Scoring in Targeted Online Advertising. ACM SIGKDD Conf. on Knowledge Discovery and Data Mining, 2012.

M. Richardson, E. Dominowska, and R. Ragno. Predicting Clicks: Estimating the Click-through rate for New Ads. Proceedings of the 16th international conference on World Wide Web, pp. 521{530, 2007.

W. Zhang, Y. Zhang, B. Gao, Y. Yu, X. Yuan, and T.-Y. Liu. Joint Optimization of Bid and Budget Allocation in Sponsored Search. ACM SIGKDD Conf. on Knowledge Discovery and Data Mining, 2012.

Anand Bhalgat, Jon Feldman and Vahab Mirrokni, Online Allocation of Display Ads with Smooth Delivery, 9pp., Aug. 2012.

Anand Bhalgat, Nitish Korola, Hennadiy Leontyev, Max Lin and Vahab Mirrokni, Partner Tiering in Display Advertising, 10pp., Feb. 2014.

Ye Chen, Pavel Berkhin, Bo Anderson and Nikhil R. Devanur, Real-Time Bidding Algorithms for Performance-Based Display Ad Allocation, 9pp., Aug. 2011.

* cited by examiner

PACING CONTROL FOR ONLINE AD CAMPAIGNS

BACKGROUND

This application relates to pacing control of ad delivery for online ad campaigns.

Increasingly, advertising is being integrated with online content. Online audiences are demanding free content or at least content delivered at below market prices. Because of this demand, publishers and content networks may be delivering ads with such content to compensate for lost profits. The delivery of online ads may be through various channels, such as search, mobile search, display, mobile display, and native advertising.

One way to make use of the variety of online advertising channels is through a unified approach to digital advertising (e.g., Yahoo Ad Manager and Ad Manager Plus). Such a unified approach can reduce some of the issues faced with online advertising. For example, online advertising can be fragmented and difficult to ascertain. A unified approach can be customer-friendly by making access to various advertising channels through a unified interface. This allows customers to target and even retarget audiences seamlessly through various channels. However, by unifying various channels, analysis and enhancement of such a unified marketplace can be extremely complex and difficult to model.

To make matters even more complex, advertising can be supplied through auction-based advertising exchanges. A demand-side platform (DSP) can receive tens of billions of ad requests a day from several of Supply-Side Platforms (SSPs). Each ad impression can be traded with a different price through an auction, making enhancements and modeling extraordinarily difficult. In such a market, DSPs are parties who act as agents for advertisers and manage ad campaigns through direct buying ad-networks and/or real-time bidding (RTB) ad exchanges in order to acquire different ad impressions.

Some expectations of a DSP can include reaching delivery and performance goals of a campaign, executing a budget spending plan, and reducing creative serving costs. Reaching delivery and performance goals may include using a budget to have an extensive reach while meeting campaign performance goals. For example, in performance driven campaigns, the expectation may be to meet a performance goal while spending as much budget as possible. Execution of a budget spending plan usually includes goals of having a sustainable impact, increasing synergy with other medias, and distributing ads smoothly throughout a purchased period in order to reach a wider range of audiences. For example, an advertiser may expect a budget for a campaign to be spent evenly throughout time slots of the campaign. Reducing creative serving cost may also be a criterion. This criterion is even more important nowadays that more and more ad campaigns are in the form of video or rich media. The creative serving costs of these types of impressions can be as much as premium inventory costs, so the advertisers may desire to reduce costs by being more selective about their ad impressions.

It is increasingly challenging to meet the aforementioned expectations, especially meeting them simultaneously. Additionally, a campaign can have its own budget, budget spending plan, targeted audiences, performance goals, and creative serving costs. Also, an increasing number of DSPs compete with each other to acquire inventory through auctions, which can cause price elasticity and bid landscape between demand and supply to change frequently. Such variations can make campaign enhancement difficult. Additionally, the rapid growth of emerging online industries, such as mobile applications and user-generated content platforms, has led to increasing complexity in managing DSPs.

Additionally, with regard to pacing, advertisers look for maximizing campaign performance goals within budget schedules. Often customers prefer to impose delivery constraints to spend budget consistently and reach a wider range of audiences, and still have a sustainable impact on audiences. Also, since impressions and clicks are traded through auctions across many ad exchanges in a DSP, pricing on impressions and clicks can change rapidly and dynamically, as can the supply and demand for advertising opportunities online. Therefore, it can be challenging to perform pacing control and maximize the campaign performance simultaneously.

There is, therefore, a set of engineering problems to be solved in order to enhance management of DSPs, provide pacing control, and maximize campaign performance, simultaneously. The novel technologies described herein set out to solve such problems, which are technical considering the vast reach and scope of a DSP. Without adequate solutions to such problems, server-side and network resources can be quickly exhausted and costs of maintaining such resources can rise exponentially with the expansion of a DSP. Furthermore, the novel technologies described herein set out to solve the problem of overly complex modeling that can even occur in single-channel ad campaigns. At this point, there is room for improving DSPs, pacing control, and campaign performance.

BRIEF DESCRIPTION OF THE DRAWINGS

The systems and methods may be better understood with reference to the following drawings and description. Non-limiting and non-exhaustive examples are described with reference to the following drawings. The components in the drawings are not necessarily to scale; instead, emphasis is being placed upon illustrating the principles of the system. In the drawings, like referenced numerals designate corresponding parts throughout the different views.

DETAILED DESCRIPTION

Subject matter will now be described more fully with reference to the accompanying drawings, which form a part hereof, and which show, by way of illustration, specific examples. Subject matter may, however, be embodied in a variety of different forms and, therefore, covered or claimed subject matter is intended to be construed as not being limited to examples set forth herein; examples are provided merely to be illustrative. Likewise, a reasonably broad scope for claimed or covered subject matter is intended. Among other things, for example, subject matter may be embodied as methods, devices, components, or systems. The following detailed description is, therefore, not intended to be limiting on the scope of what is claimed.

Overview

Contemporary ad campaign enhancement may rely on estimating bids for ad impressions and response rates (such as impression rates or click-through rates). Such enhancement techniques are not known to use a consistent delivery constraint. The techniques described herein use budget allocation along with the estimations of bids and response rates. With use of budget allocation, the techniques can use budget pacing to enhance impressions and maximize desired responses, such as desired click-through rates. These techniques focus on enhancing pacing and performance of ad campaigns, such as enhancing performance across distinct and/or unified online ad marketplaces, especially in the context of DSPs. In examples, the techniques assume that impression inventory supply is much larger than advertiser demand for impressions of their ads, so such techniques focus on selecting high performing inventory of ad space. Yet, with such a focus, a smooth or consistent delivery of ads over time is used. In some examples, the techniques can enhance budget pacing and bid price estimation based on prior bids and responses of the bid landscape. Additionally or alternatively, the techniques can adjust and enhance pacing and bid pricing in an RTB environment.

Description of the Drawings

Figure 1:
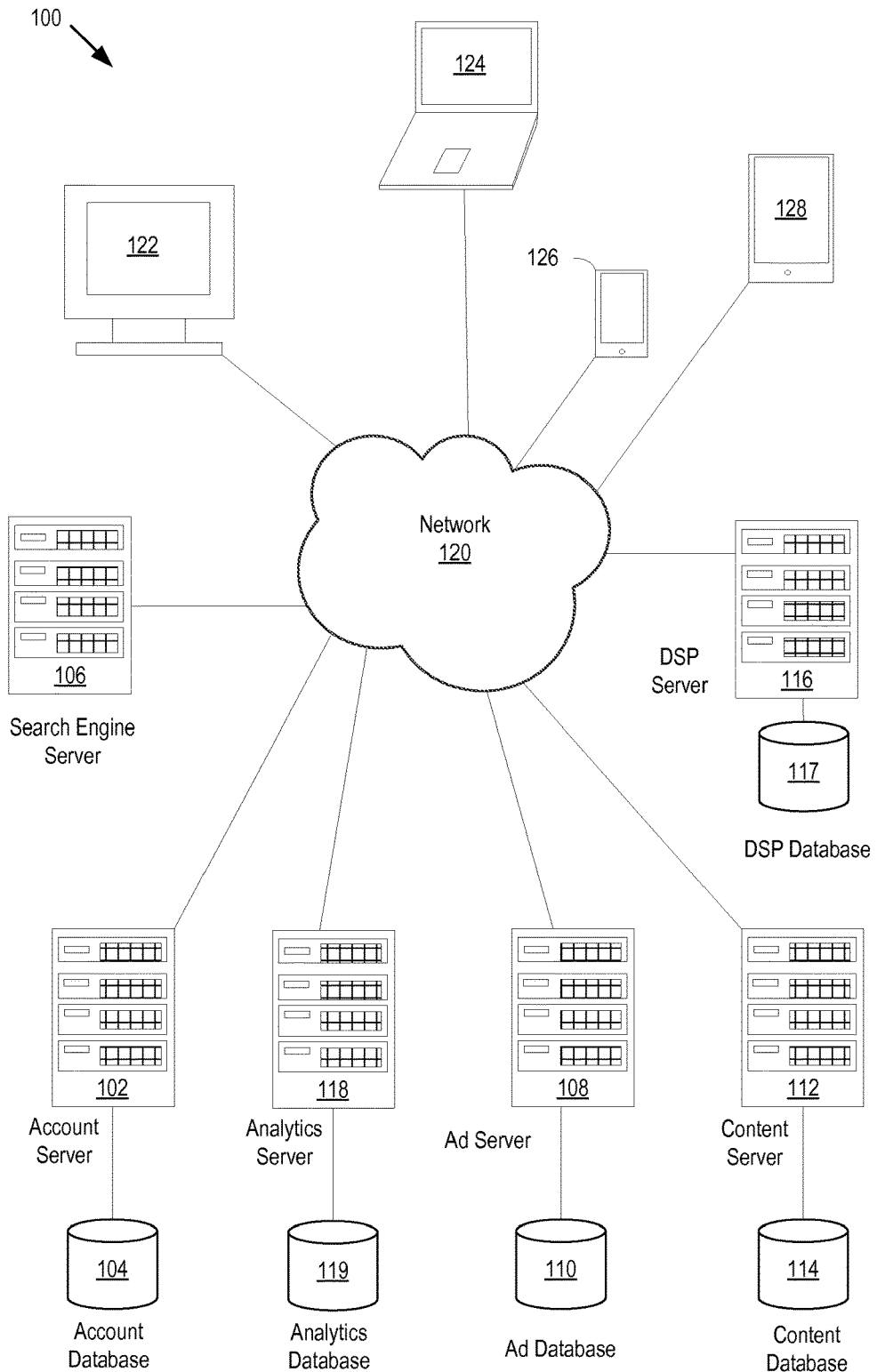
FIG. 1 illustrates a block diagram of an example information system that includes example devices of a network supporting a DSP that includes ad campaign pacing control.

FIG. 1 illustrates a block diagram of an example information system that includes example devices of a network supporting a DSP that includes ad campaign pacing control. The information system 100 in the example of FIG. 1 includes an account server 102, an account database 104, a search engine server 106, an ad server 108, an ad database 110, a content database 114, a content server 112, a DSP server 116, a DSP database 117, an analytics server 118, and an analytics database 119. The aforementioned servers and databases can be communicatively coupled over a network 120. The network 120 may be a computer network. The aforementioned servers may each be one or more server computers.

The information system 100 may be accessible over the network 120 by advertiser devices and audience devices, which may be desktop computers (such as device 122), laptop computers (such as device 124), smartphones (such as device 126), and tablet computers (such as device 128). An audience device can be a user device that presents online advertisements, such as a device that presents online advertisements to an audience member. In various examples of such an online information system, users may search for and obtain content from sources over the network 120, such as obtaining content from the search engine server 106, the ad server 108, the ad database 110, the content server 112, and the content database 114. Advertisers may provide advertisements for placement on online properties, such as web pages, and other communications sent over the network to audience devices. The online information system can be deployed and operated by an online services provider, such as Yahoo! Inc.

The account server 102 stores account information for advertisers. The account server 102 is in data communication with the account database 104. Account information may include database records associated with each respective advertiser. Suitable information may be stored, maintained, updated and read from the account database 104 by the account server 102. Examples include advertiser identification information, advertiser security information, such as passwords and other security credentials, account balance information, and information related to content associated with their ads, and user interactions associated with their ads and associated content.

The account information may include ad booking information, and such booking information may be communicated to the DSP server 116 for processing. This booking information can be used as input for determining variables illustrated in FIGS. 3-7, 9, and 10, such as determining any of the variables y(t), r(t), and e(t) and any of the constant parameters $K_p$, $K_i$, and $K_d$ used as gain for a controller. Parts of the booking information can be derived from the variable u(t), which can represent pacing rate $r^t$. $r^t$ is described in more detail within the descriptions of FIGS. 3-6. For example, parts of the booking information, such as bids on impressions, can be derived from an ad campaign pacing rate and/or a response rate (such as a rate of ad impressions or ad clicks). The variables u(t), y(t), r(t), and e(t) and the constant parameters $K_p$, $K_i$, and $K_d$ are described in more detail within the descriptions of FIGS. 9 and 10.

The account server 102 may be implemented using a suitable device. The account server 102 may be implemented as a single server, a plurality of servers, or another type of computing device known in the art. Access to the account server 102 can be accomplished through a firewall that protects the account management programs and the account information from external tampering. Additional security may be provided via enhancements to the standard communications protocols, such as Secure HTTP (HTTPS) or the Secure Sockets Layer (SSL). Such security may be applied to any of the servers of FIG. 1, for example.

The account server 102 may provide an advertiser front end to simplify the process of accessing the account information of an advertiser. The advertiser front end may be a program, application, or software routine that forms a user interface. In a particular example, the advertiser front end is accessible as a website with electronic properties that an accessing advertiser may view on an advertiser device, such as one of the devices 122-128 when logged on by an advertiser. The advertiser may view and edit account data and advertisement data, such as ad booking data, using the advertiser front end. After editing the advertising data, the account data may then be saved to the account database 104.

The search engine server 106 may be one or more servers. Alternatively, the search engine server 106 may be a computer program, instructions, or software code stored on a computer-readable storage medium that runs on one or more processors of one or more servers. The search engine server 106 may be accessed by audience devices over the network 120. An audience client device may communicate a user query to the search engine server 106. For example, a query entered into a query entry box can be communicated to the search engine server 106. The search engine server 106 locates matching information using a suitable protocol or algorithm and returns information to the audience client device, such as in the form of ads or content.

The search engine server 106 may be designed to help users and potential audience members find information located on the Internet or an intranet. In an example, the search engine server 106 may also provide to the audience client device over the network 120 an electronic property, such as a web page, with content, including search results, information matching the context of a user inquiry, links to other network destinations, or information and files of information of interest to a user operating the audience client device, as well as a stream or web page of content items and advertisement items selected for display to the user. This information provided by the search engine server 106 may be logged, and such logs may be communicated to the analytics server 118 for processing and analysis. Besides this information, any data outputted by processes of the servers of FIG. 1 may also be logged, and such logs can be communicated to the analytics server 118 for further processing and analysis. Once processed into corresponding analytics data, the analytics data can be input for determining any of the variables described herein, such as any of the variables illustrated in FIGS. 3-7, 9, and 10 including variables y(t), r(t), and e(t) and any of the constant parameters $K_p$, $K_i$, and $K_d$ used as gain for a controller.

The search engine server 106 may enable a device, such as an advertiser client device or an audience client device, to search for files of interest using a search query. Typically, the search engine server 106 may be accessed by a client device (such as the devices 122-128) via servers or directly over the network 120. The search engine server 106 may include a crawler component, an indexer component, an index storage component, a search component, a ranking component, a cache, a profile storage component, a logon component, a profile builder, and application program interfaces (APIs). The search engine server 106 may be deployed in a distributed manner, such as via a set of distributed servers, for example. Components may be duplicated within a network, such as for redundancy or better access.

The ad server 108 may be one or more servers. Alternatively, the ad server 108 may be a computer program, instructions, and/or software code stored on a computer-readable storage medium that runs on one or more processors of one or more servers. The ad server 108 operates to serve advertisements to audience devices. An advertisement may include text data, graphic data, image data, video data, or audio data. Advertisements may also include data defining advertisement information that may be of interest to a user of an audience device. The advertisements may also include respective audience targeting information and/or ad campaign information. An advertisement may further include data defining links to other online properties reachable through the network 120. The aforementioned audience targeting information and the other data associated an ad may be logged in data logs. These logs, similar to other data logs described herein, can also be communicated to the analytics server 118 for further processing and analysis. Once processed into corresponding analytics data, the analytics data can be input for determining any of the variables described herein, such as any of the variables illustrated in FIGS. 3-7, 9, and 10 including variables y(t), r(t), and e(t) and any of the constant parameters $K_p$, $K_i$, and $K_d$ used as gain for a controller.

For online service providers, advertisements may be displayed on electronic properties resulting from a user-defined search based, at least in part, upon search terms. Also, advertising may be beneficial and/or relevant to various audiences, which may be grouped by demographic and/or psychographic. A variety of techniques have been developed to determine audience groups and to subsequently target relevant advertising to members of such groups. Group data and individual user's interests and intentions along with targeting data related to campaigns may be may be logged in data logs. As mentioned, one approach to presenting targeted advertisements includes employing demographic characteristics (such as age, income, sex, occupation, etc.) for predicting user behavior, such as by group. Advertisements may be presented to users in a targeted audience based, at least in part, upon predicted user behavior. Another approach includes profile-type ad targeting. In this approach, user profiles specific to a user may be generated to model user behavior, for example, by tracking a user's path through a website or network of sites, and compiling a profile based, at least in part, on pages or advertisements ultimately delivered. A correlation may be identified, such as for user purchases, for example. An identified correlation may be used to target potential purchasers by targeting content or advertisements to particular users. Similarly, the aforementioned profile-type targeting data may be logged in data logs. Yet another approach includes targeting based on content of an electronic property requested by a user. Advertisements may be placed on an electronic property or in association with other content that is related to the subject of the advertisements. The relationship between the content and the advertisement may be determined in a suitable manner. The overall theme of a particular electronic property may be ascertained, for example, by analyzing the content presented therein. Moreover, techniques have been developed for displaying advertisements geared to the particular section of the article currently being viewed by the user. Accordingly, an advertisement may be selected by matching keywords, and/or phrases within the advertisement and the electronic property. The aforementioned targeting data may be logged in data logs.

The ad server 108 includes logic and data operative to format the advertisement data for communication to an audience member device, which may be any of the devices 122-128. The ad server 108 is in data communication with the ad database 110. The ad database 110 stores information, including data defining advertisements, to be served to user devices. This advertisement data may be stored in the ad database 110 by another data processing device or by an advertiser. The advertising data may include data defining advertisement creatives and bid amounts for respective advertisements and/or audience segments. The aforementioned ad formatting and pricing data may be logged in data logs.

The advertising data may be formatted to an advertising item that may be included in a stream of content items and advertising items provided to an audience device. The formatted advertising items can be specified by appearance, size, shape, text formatting, graphics formatting and included information, which may be standardized to provide a consistent look for advertising items in the stream. The aforementioned advertising data may be logged in data logs.

Further, the ad server 108 is in data communication with the network 120. The ad server 108 communicates ad data and other information to devices over the network 120. This information may include advertisement data communicated to an audience device. This information may also include advertisement data and other information communicated with an advertiser device. An advertiser operating an advertiser device may access the ad server 108 over the network to access information, including advertisement data. This access may include developing advertisement creatives, editing advertisement data, deleting advertisement data, setting and adjusting bid amounts and other activities. The ad server 108 then provides the ad items to other network devices, such as the DSP server 116, the analytics server 118, and/or the account server 102. Ad items and ad information, such as pricing, can be used as input for determining any of the variables described herein, such as any of the variables illustrated in FIGS. 3-7, 9, and 10 including variables y(t), r(t), and e(t) and any of the constant parameters $K_p$, $K_i$, and $K_d$ used as gain for a controller.

The ad server 108 may provide an advertiser front end to simplify the process of accessing the advertising data of an advertiser. The advertiser front end may be a program, application or software routine that forms a user interface. In one particular example, the advertiser front end is accessible as a website with electronic properties that an accessing advertiser may view on the advertiser device. The advertiser may view and edit advertising data using the advertiser front end. After editing the advertising data, the advertising data may then be saved to the ad database 110 for subsequent communication in advertisements to an audience device. In viewing and editing the advertising data, adjustments can be used as input for determining any of the variables described herein, such as any of the variables illustrated in FIGS. 3-7, 9, and 10 including variables y(t), r(t), and e(t) and any of the constant parameters $K_p$, $K_i$, and $K_d$ used as gain for a controller. The advertiser front end may also provide a graphical user interface for simulating ad campaigns according to a controller.

The content server 112 may access information about content items either from the content database 114 or from another location accessible over the network 120. The content server 112 communicates data defining content items and other information to devices over the network 120. The information about content items may also include content data and other information communicated by a content provider operating a content provider device. A content provider operating a content provider device may access the content server 112 over the network 120 to access information. This access may be for developing content items, editing content items, deleting content items, setting and adjusting bid amounts and other activities, such as associating content items with certain types of ad campaigns. A content provider operating a content provider device may also access the DSP server 116 over the network 120 to access analytics data and controller related data. Such analytics and controller data may help focus developing content items, editing content items, deleting content items, setting and adjusting bid amounts, and activities related to distribution of the content.

The content server 112 may provide a content provider front end to simplify the process of accessing the content data of a content provider. The content provider front end may be a program, application or software routine that forms a user interface. In a particular example, the content provider front end is accessible as a website with electronic properties that an accessing content provider may view on the content provider device. The content provider may view and edit content data using the content provider front end. After editing the content data, such as at the content server 112 or another source of content, the content data may then be saved to the content database 114 for subsequent communication to other devices in the network 120. In editing the content data, adjustments to controller variables and parameters may be determined and presented upon editing of the content data, so that a publisher can view how changes affect pacing of one or more ad campaigns.

The content provider front end may be a client-side application. A script and/or applet and the script and/or applet may manage the retrieval of campaign data. In an example, this front end may include a graphical display of fields for selecting audience segments, segment combinations, or at least parts of campaigns. Then this front end, via the script and/or applet, can request data related to campaign pacing from the DSP server 116. The information related to campaign pacing can then be displayed, such as displayed according to the script and/or applet.

The content server 112 includes logic and data operative to format content data for communication to the audience device. The content server 112 can provide content items or links to such items to the analytics server 118 or the DSP server 116 to associate with campaign pacing. For example, content items and links may be matched to such data. The matching may be complex and may be based on historical information related to control of campaigns, such as pacing control of campaigns.

The content data may be formatted to a content item that may be included in a stream of content items and advertisement items provided to an audience device. The formatted content items can be specified by appearance, size, shape, text formatting, graphics formatting and included information, which may be standardized to provide a consistent look for content items in the stream. The formatting of content data and other information and data outputted by the content server may be logged in data logs. For example, content items may have an associated bid amount that may be used for ranking or positioning the content items in a stream of items presented to an audience device. In other examples, the content items do not include a bid amount, or the bid amount is not used for ranking the content items. Such content items may be considered non-revenue generating items. The bid amounts and other related information may be logged in data logs.

The aforementioned servers and databases may be implemented through a computing device. A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Servers may vary widely in configuration or capabilities, but generally, a server may include a central processing unit and memory. A server may also include a mass storage device, a power supply, wired and wireless network interfaces, input/output interfaces, and/or an operating system, such as Windows Server, Mac OS X, UNIX, Linux, FreeBSD, or the like.

The aforementioned servers and databases may be implemented as online server systems or may be in communication with online server systems. An online server system may include a device that includes a configuration to provide data via a network to another device including in response to received requests for page views or other forms of content delivery. An online server system may, for example, host a site, such as a social networking site, examples of which may include, without limitation, FLICKER, TWITTER, FACEBOOK, LINKEDIN, or a personal user site (such as a blog, vlog, online dating site, etc.). An online server system may also host a variety of other sites, including, but not limited to business sites, educational sites, dictionary sites, encyclopedia sites, wikis, financial sites, government sites, etc.

An online server system may further provide a variety of services that may include web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example. Examples of devices that may operate as an online server system include desktop computers, multiprocessor systems, microprocessor-type or programmable consumer electronics, etc. The online server system may or may not be under common ownership or control with the servers and databases described herein.

The network 120 may include a data communication network or a combination of networks. A network may couple devices so that communications may be exchanged, such as between a server and a client device or other types of devices, including between wireless devices coupled via a wireless network, for example. A network may also include mass storage, such as a network attached storage (NAS), a storage area network (SAN), or other forms of computer or machine readable media, for example. A network may include the Internet, local area networks (LANs), wide area networks (WANs), wire-line type connections, wireless type connections, or any combination thereof. Likewise, sub-networks, such as may employ differing architectures or may be compliant or compatible with differing protocols, may interoperate within a larger network, such as the network 120.

Various types of devices may be made available to provide an interoperable capability for differing architectures or protocols. For example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links, including satellite links, or other communication links or channels, such as may be known to those skilled in the art. Furthermore, a computing device or other related electronic devices may be remotely coupled to a network, such as via a telephone line or link, for example.

An advertiser client device, which may be any one of the device 122-128, includes a data processing device that may access the information system 100 over the network 120. The advertiser client device is operative to interact over the network 120 with any of the servers or databases described herein. The advertiser client device may implement a client-side application for viewing electronic properties and submitting user requests. The advertiser client device may communicate data to the information system 100, including data defining electronic properties and other information. The advertiser client device may receive communications from the information system 100, including data defining electronic properties and advertising creatives. The aforementioned interactions and information may be logged in data logs.

In an example, content providers may access the information system 100 with content provider devices that are generally analogous to the advertiser devices in structure and function. The content provider devices provide access to content data in the content database 114, for example.

An audience client device, which may be any of the devices 122-128, includes a data processing device that may access the information system 100 over the network 120. The audience client device is operative to interact over the network 120 with the search engine server 106, the ad server 108, the content server 112, the DSP server 116, and the analytics server 118. The audience client device may implement a client-side application for viewing electronic content and submitting user requests. A user operating the audience client device may enter a search request and communicate the search request to the information system 100. The search request is processed by the search engine and search results are returned to the audience client device. The aforementioned interactions and information may be logged.

In other examples, a user of the audience client device may request data, such as a page of information from the online information system 100. The data instead may be provided in another environment, such as a native mobile application, TV application, or an audio application. The online information system 100 may provide the data or re-direct the browser to another source of the data. In addition, the ad server may select advertisements from the ad database 110 and include data defining the advertisements in the provided data to the audience client device. The aforementioned interactions and information may be logged in data logs and such logs.

An advertiser client device and an audience client device operate as a client device when accessing information on the information system 100. A client device, such as any of the devices 122-128, may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

A client device may vary in terms of capabilities or features. Claimed subject matter is intended to cover a wide range of potential variations. For example, a cell phone may include a numeric keypad or a display of limited functionality, such as a monochrome liquid crystal display (LCD) for displaying text. In contrast, however, as another example, a web-enabled client device may include a physical or virtual keyboard, mass storage, an accelerometer, a gyroscope, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating messages, such as via email, short message service (SMS), or multimedia message service (MMS), including via a network, such as a social network, including, for example, FACEBOOK, LINKEDIN, TWITTER, FLICKR, OR GOOGLE+, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally or remotely stored or streamed video, or games. The foregoing is provided to illustrate that claimed subject matter is intended to include a wide range of possible features or capabilities. At least some of the features, capabilities, and interactions with the aforementioned may be logged in data logs.

Also, the disclosed methods and systems may be implemented at least partially in a cloud-computing environment, at least partially in a server, at least partially in a client device, or in a combination thereof.

Figure 2:
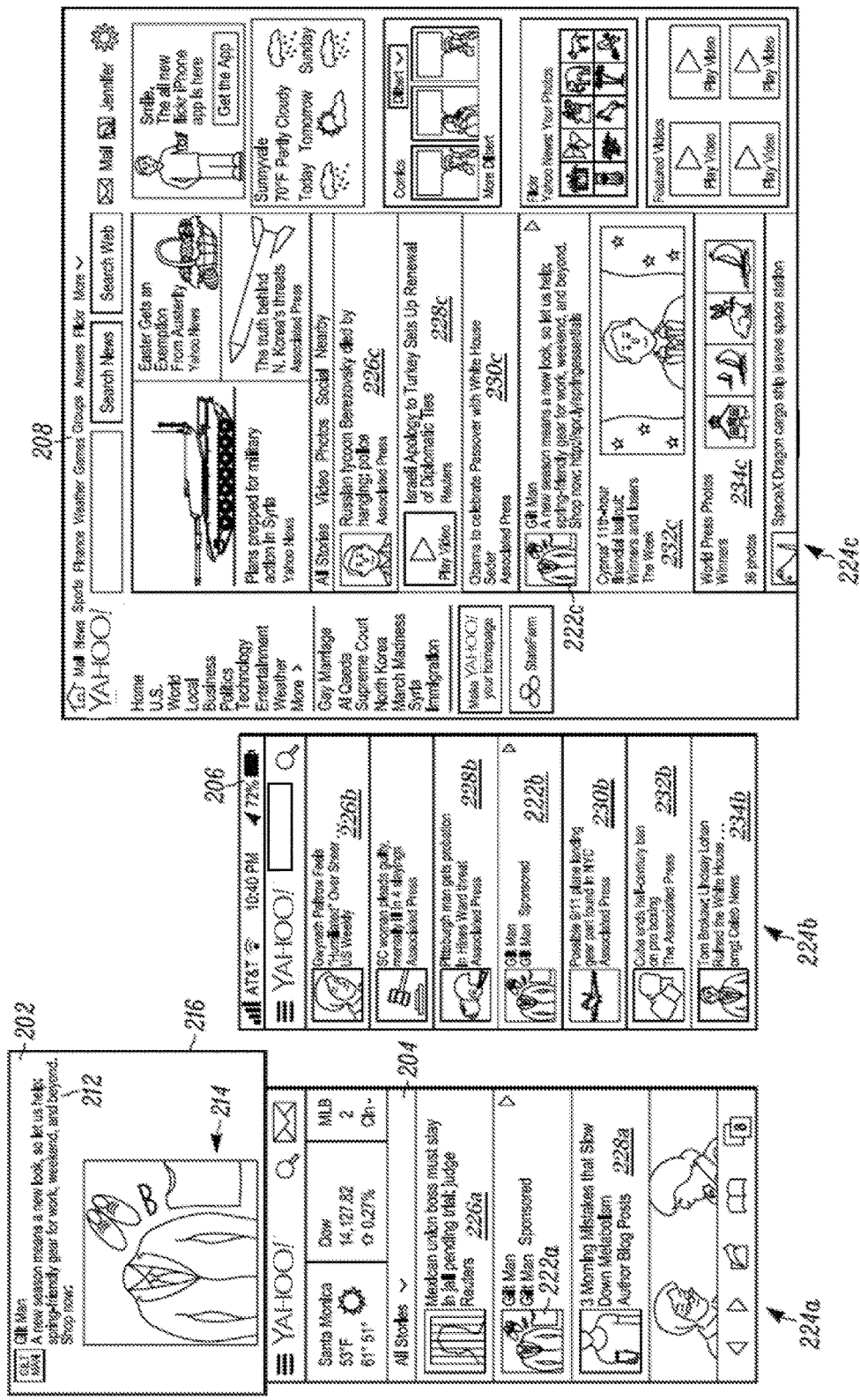
FIG. 2 illustrates displayed ad items and content items of example screens rendered by client-side applications associated with the information system illustrated in FIG. 1.

FIG. 2 illustrates displayed ad items and content items of example screens rendered by client-side applications. The content items and ad items displayed may be provided by the search engine server 106, the ad server 108, or the content server 112. User interactions with the ad items and content items can be tracked and logged in data logs, and the logs may be communicated to the analytics server 118 for processing. Once processed into corresponding analytics data, such data can be input for determining control variables (such as y(t), r(t), and e(t)) and parameters (such as $K_p$, $K_i$, and $K_d$) and control variables specific to pacing (such as $p_i$, $s^r$, $r^r$, R, and $\hat{p}$, which are described further below).

In FIG. 2, a display ad 202 is illustrated as displayed on a variety of displays including a mobile web device display 204, a mobile application display 206 and a personal computer display 208. The mobile web device display 204 may be shown on the display screen of a smart phone, such as the device 126. The mobile application display 206 may be shown on the display screen of a tablet computer, such as the device 128. The personal computer display 208 may be displayed on the display screen of a personal computer (PC), such as the desktop computer 122 or the laptop computer 124.

The display ad 202 is shown in FIG. 2 formatted for display on an audience device but not as part of a stream to illustrate an example of the contents of such a display ad. The display ad 202 includes text 212, graphic images 214 and a defined boundary 216. The display ad 202 can be developed by an advertiser for placement on an electronic property, such as a web page, sent to an audience device operated by a user. The display ad 202 may be placed in a wide variety of locations on the electronic property. The defined boundary 216 and the shape of the display ad can be matched to a space available on an electronic property. If the space available has the wrong shape or size, the display ad 202 may not be useable. Such reformatting may be logged in data logs and such logs may be communicated to the analytics server 118 for processing. Once processed into corresponding analytics data, such data can be input for determining control variables and parameters.

In these examples, the display ad is shown as a part of streams 224a, 224b, and 224c. The streams 224a, 224b, and 224c include a sequence of items displayed, one item after another, for example, down an electronic property viewed on the mobile web device display 204, the mobile application display 206 and the personal computer display 208. The streams 224a, 224b, and 224c may include various types of items. In the illustrated example, the streams 224a, 224b, and 224c include content items and advertising items. For example, stream 224a includes content items 226a and 228a along with advertising item 222a; stream 224b includes content items 226b, 228b, 230b, 232b, 234b and advertising item 222b; and stream 224c includes content items 226c,
228c, 230c, 232c and 234c and advertising item 222c. With respect to FIG. 2, the content items can be items published by non-advertisers. However, these content items may include advertising components. Each of the streams 224a, 224b, and 224c may include a number of content items and advertising items.

In an example, the streams 224a, 224b, and 224c may be arranged to appear to the user to be an endless sequence of items, so that as a user, of an audience device on which one of the streams 224a, 224b, or 224c is displayed, scrolls the display, a seemingly endless sequence of items appears in the displayed stream. The scrolling can occur via the scroll bars, for example, or by other known manipulations, such as a user dragging his or her finger downward or upward over a touch screen displaying the streams 224a, 224b, or 224c. To enhance the apparent endless sequence of items so that the items display quicker from manipulations by the user, the items can be cached by a local cache and/or a remote cache associated with the client-side application or the page view. Such interactions may be communicated to the analytics server 118; and once processed into corresponding analytics data, such data can be input for determining control variables and parameters.

The content items positioned in any of streams 224a, 224b, and 224c may include news items, business-related items, sports-related items, etc. Further, in addition to textual or graphical content, the content items of a stream may include other data as well, such as audio and video data or applications. Each content item may include text, graphics, other data, and a link to additional information. Clicking or otherwise selecting the link re-directs the browser on the client device to an electronic property referred to as a landing page that contains the additional information. The clicking or otherwise selecting of the link, the re-direction to the landing page, the landing page, and the additional information, for example, can each be tracked, and then the data associated with the tracking can be logged in data logs, and such logs may be communicated to the analytics server 118 for processing. Once processed into corresponding analytics data, such data can be input for determining control variables and parameters.

Stream ads like the advertising items 222a, 222b, and 222c may be inserted into the stream of content, supplementing the sequence of related items, providing a more seamless experience for end users. Similar to content items, the advertising items may include textual or graphical content as well as other data, such as audio and video data or applications. Each advertising item 222a, 222b, and 222c may include text, graphics, other data, and a link to additional information. Clicking or otherwise selecting the link re-directs the browser on the client device to an electronic property referred to as a landing page. The clicking or otherwise selecting of the link, the re-direction to the landing page, the landing page, and the additional information, for example, can each be tracked, and then the data associated with the tracking can be logged in data logs, and such logs may be communicated to the analytics server 118 for processing. Once processed into corresponding analytics data, such data can be input for determining control variables and parameters.

While the example streams 224a, 224b, and 224c are shown with a single visible advertising item 222a, 222b, and 222c, respectively, a number of advertising items may be included in a stream of items. Also, the advertising items may be slotted within the content, such as slotted the same for all users or slotted based on personalization or grouping, such as grouping by audience members or content. Adjustments of the slotting may be according to various dimensions and algorithms. Also, slotting may be according to campaign control.

The slotting and any other operation associated with campaign control described herein may occur via controller interface circuitry that provides interfacing between a controller and other types of circuits, such as a circuit of any of the servers illustrated in FIG. 1. The controller interface circuitry and the controller may be hosted on the DSP server 116.

Figure 3:
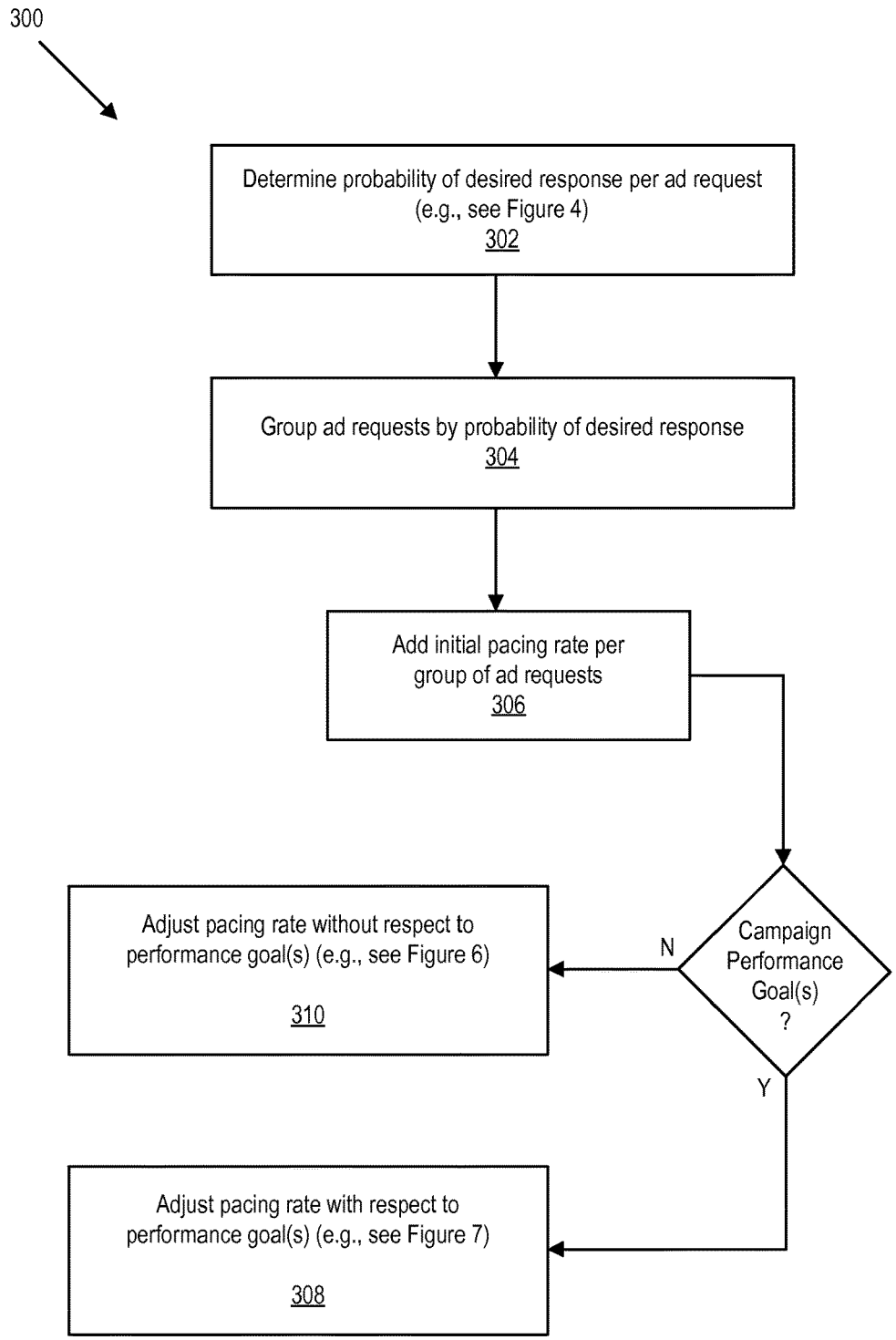
FIGS. 3-6 illustrate example operations performed by one or more aspects of the system in FIG. 1, which can provide pacing control for online ad campaigns utilizing a DSP.
Figure 4:
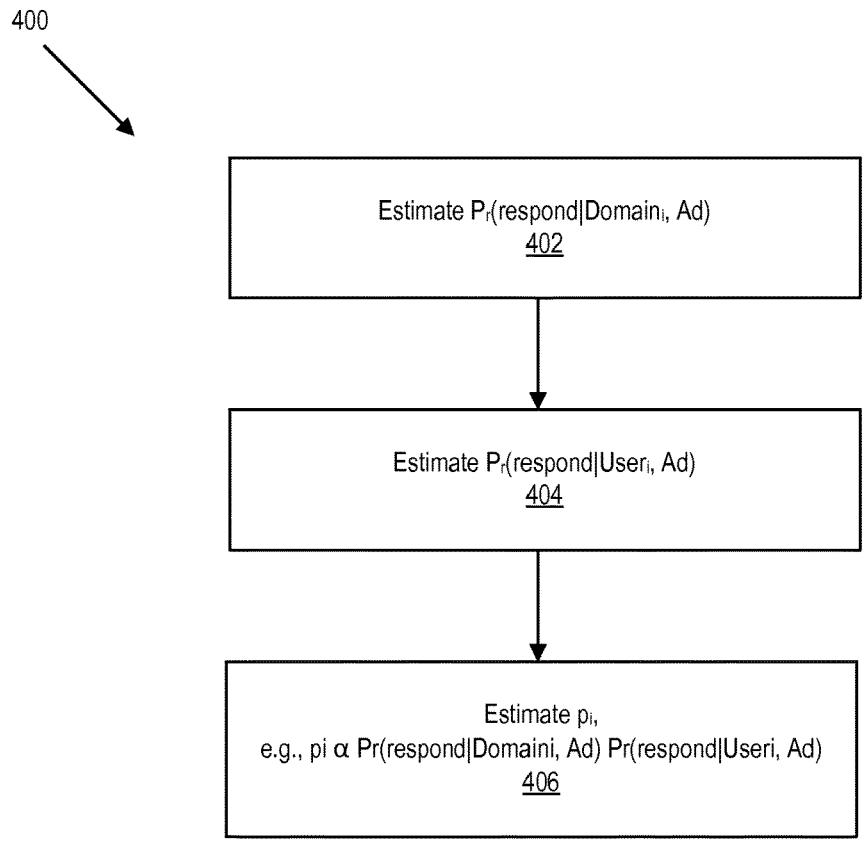

FIG. 3 illustrates example operations 300 performed by one or more aspects of the system in FIG. 1, which can provide pacing control for online ad campaigns utilizing a DSP. An aspect of the system, such as the DSP server 116 can receive online ad campaign information. This information can include campaign budget information and campaign performance goal information. The budget information can include a spending plan that may include a sequence of budgets over one or more time slots and a budgeted amount for bidding on ad impressions per time slot. The operations 300 may commence with determining a probability of a desired response per ad request. FIG. 4 illustrates example operations 400 performed by aspects of the pacing control system, which can provide the determination of the probability of the desired response per ad request, at 302. For example, an aspect of the system learns offline to predict a probability that a sought after response (such as a click on the ad) occurs if an ad of the ad campaign is served to a request. Such a probability can be denoted as: $p_i = \Pr(\text{respond}|\text{Request}_i, \text{Ad})$. Upon determining these probabilities for a selected number of ad requests, the requests can be grouped by the probability of the desired response at 304.

For example, at 304, impressions that have a specific range of performance scores can be grouped together. This grouping improves the scalability of the ad pacing control by grouping similarly responding ad requests together that share a same desired response rate.

In an example, grouping circuitry of the DSP server 116 (such as grouping circuitry 829 of FIG. 8), can be configured to receive online ad campaign information. The campaign information can include a sequence of budgets over a respective sequence of time slots of an online ad campaign for at least one ad. A budget of the sequence of budgets can include terms for bidding on a plurality of desired ad responses during a respective time slot of the campaign. The grouping circuitry of the DSP server 116 can also be configured to determine a probability of a given desired ad response of the plurality of desired ad responses. The given response can include an impression of an ad, a click on the ad, or both. The grouping circuitry can also be configured to determine the probability of the given desired ad response according to $p_i = \Pr(\text{respond}|\text{Request}_i, \text{Ad})$. The $p_i$ is the probability. The $P_r$ is a probability function. The respond is the given desired ad response. The $\text{Request}_i$ is an i-th ad request received by a demand side platform that includes the pacing control circuitry. The Ad is the campaign. The grouping circuitry can also be configured to determine the probability of the given desired ad response according to $p_i \alpha \Pr(\text{respond}|\text{Domain}_i, \text{Ad})\Pr(\text{respond}|\text{User}_i, \text{Ad})$. The $\text{Domain}_i$ is an i-th online property displaying the at least one ad, and the $\text{User}_i$ is an i-th audience member viewing the at least one ad. The grouping circuitry can further be configured to determine the $\Pr(\text{respond}|\text{Domain}_i, \text{Ad})$ according to a hierarchy that includes a root and descendants starting with advertiser categories, followed by advertisers, then insertion orders, then line items, and then ads. The $\Pr(\text{respond}|\text{User}_i, \text{Ad})$ can be determined according to demographics of the audience member, a geographic location of the audience member during a desired response, frequency of the desired response, recentness of the desired response, or any combination thereof. Additionally or alternatively, the grouping circuitry of the DSP server 116 can be configured to determine the probability of the given desired ad response according to a decision tree. Also, the grouping circuitry can be configured to determine the probability of the given desired ad response according to smoothing piecewise linear regression.

The grouping circuitry of the DSP server 116 can also be configured to repeat the determination of the probability of the given response for at least some of the plurality of responses, which results in a plurality of respective probabilities of the plurality of responses. Finally, the grouping circuitry can also be configured to group the plurality of responses with respect to the plurality of probabilities, resulting in a plurality of ad pacing groups. Also, the grouping circuitry can be configured to organize the plurality of ad pacing groups immediately prior to each time slot of the campaign. The grouping circuitry can further be configured to organize of the plurality of ad pacing groups by the plurality of respective probabilities of the plurality of desired ad responses, a plurality of priorities reflecting preferences between groups of the plurality of ad pacing groups, pacing rates, spending, or any combination thereof.

Figure 5:
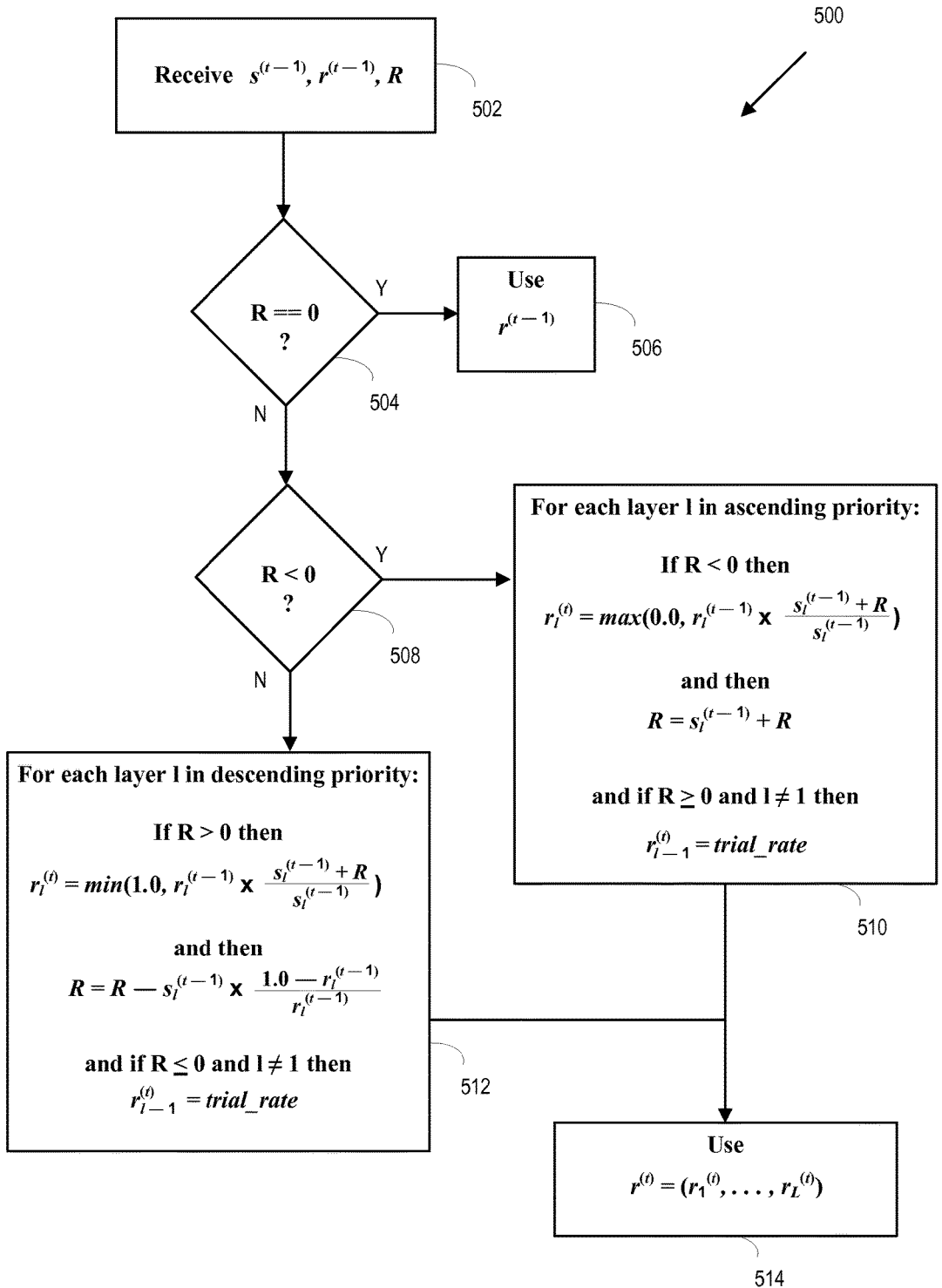
Figure 6:
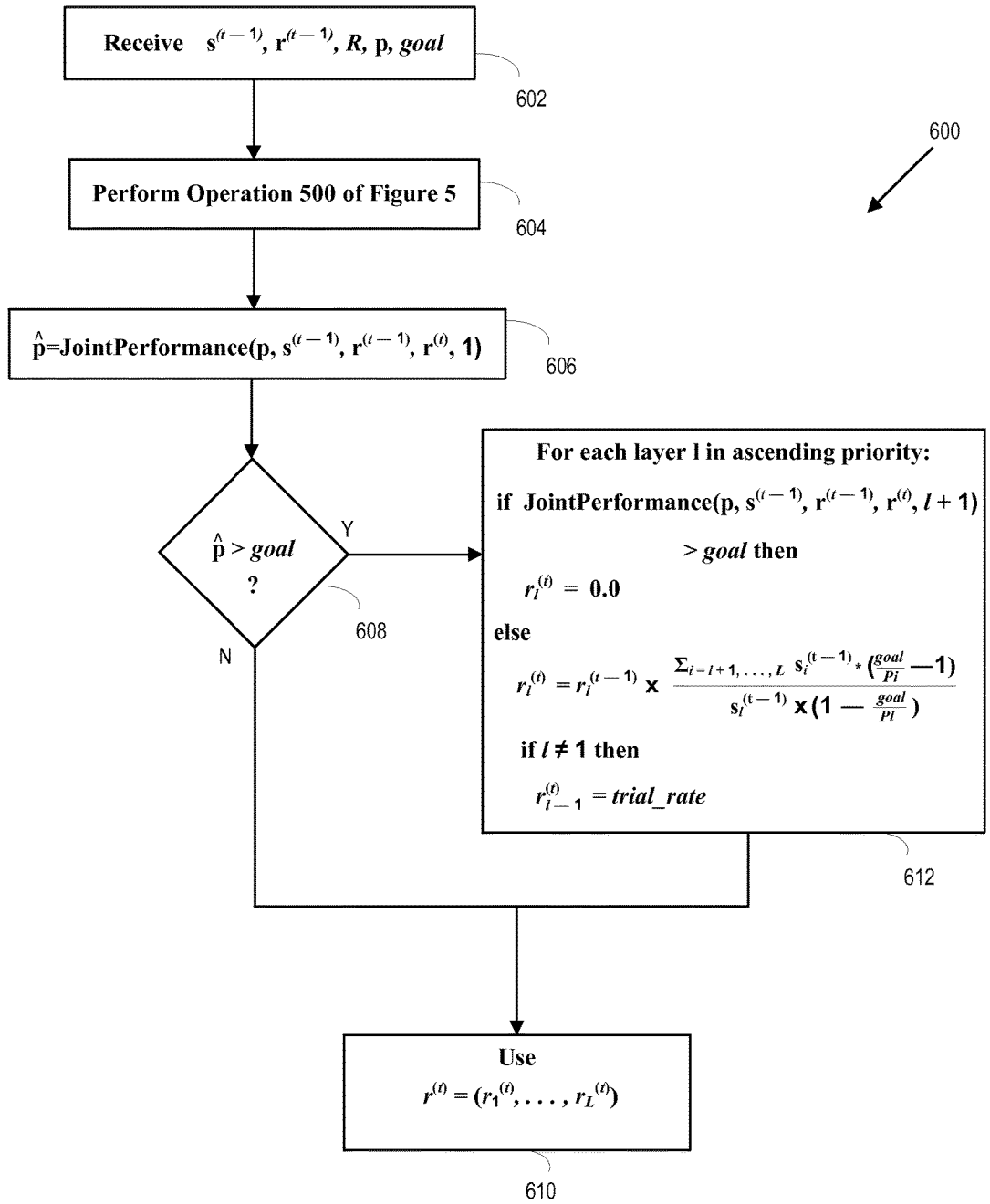

At 306 per ad campaign, an initial pacing rate is set per group of ad requests. After a selected amount of time, pacing rates are adjusted with respect to one or more performance goals at 308 or without respect to performance goal(s) at 310. Example operations for adjusting pacing rates are illustrated in FIGS. 5 and 6. FIG. 5 illustrates operations 500 for adjusting such rates with or without using performance goals. FIG. 6 illustrates operations 600 for adjusting such rates with respect to performance goals. Additionally or alternatively, these adjustments can be made according to a control system, such as a PID control system, which can learn from feedback data and adjust a group pacing rate accordingly.

Figure 8:
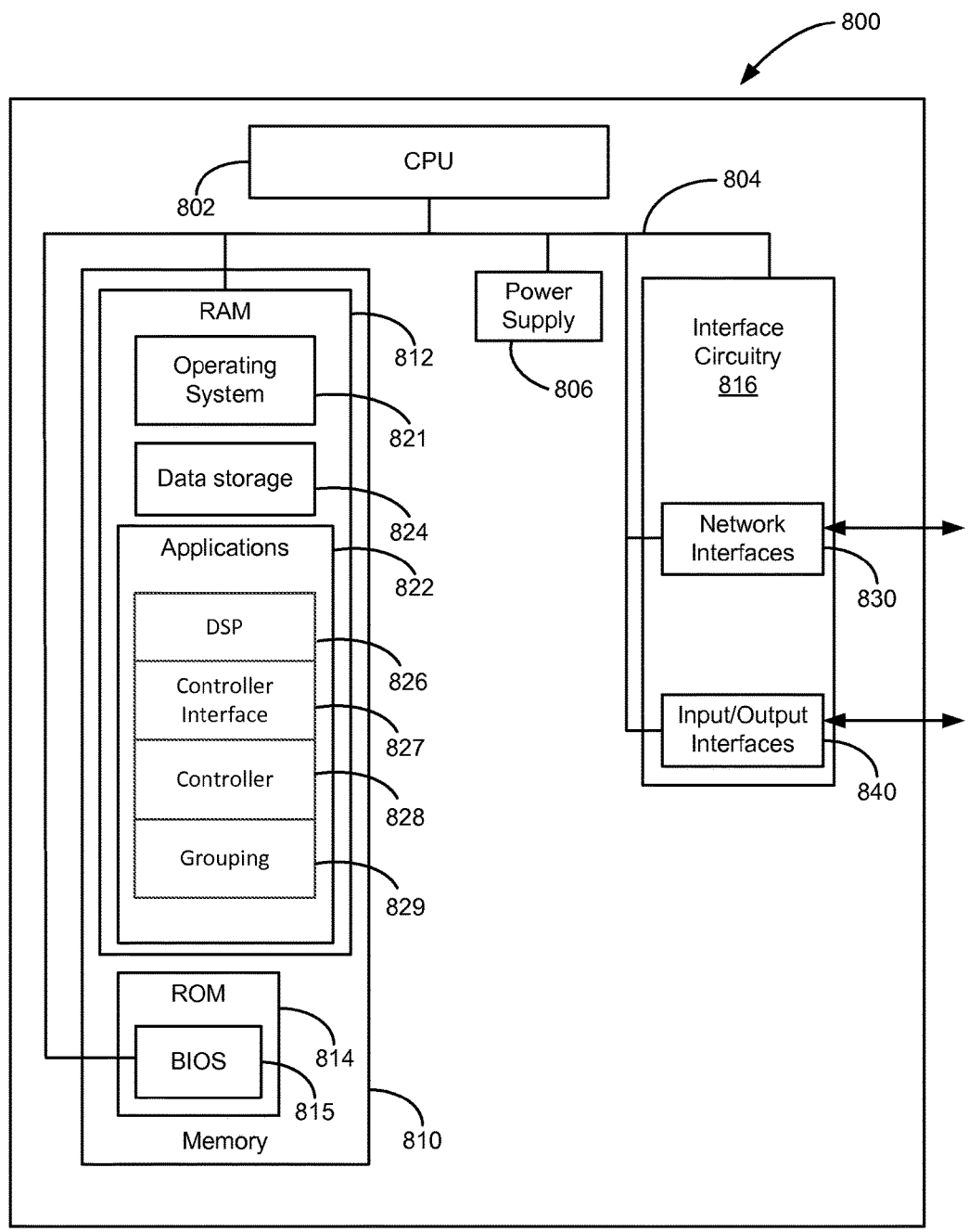
FIG. 8 is a block diagram of an example electronic device, such as a server, that can implement aspects of and related to an example control system, such as the pacing control system of the DSP server 116.

In an example, the DSP server 116 can include pacing control circuitry (which can be a part of or associated with the controller 828 illustrated in FIG. 8). The pacing control circuitry can be configured to determine a pacing rate per group of the plurality of ad pacing groups determined by the grouping circuitry of the DSP server 116. The pacing control circuitry can also be configured to adjust the pacing rate, according to a difference between costs of a first time slot and a second time slot of the campaign. Also, pacing control circuitry can be configured to determine the pacing rate according to $r_i = P_r(\text{bid}|\text{Request}_i, \text{Ad})$, wherein $r_i \in [0, 1]$ and bid is a bid on the $\text{Request}_i$. The pacing control circuitry can be further configured to determine the pacing rate according to historical information that can include analytics (such as the analytics derived from the analytics server 118 of FIG. 1.

In an example, a budget of an online ad campaign can be denoted as B and the campaign denoted as Ad. In this example, K can be the number of time slots in a spending plan of the budget, denoted as $B = (B^1, \ldots, B^K)$ where $B^t \geq 0$ and $\Sigma_{t=1, \ldots, K} B^t = B$. $\text{Request}_i$ is the i-th ad request received by a DSP. In such an example, pacing can include that the ad campaign does not necessarily bid on every eligible ad request, but bids according to a score per request. A point pacing rate of the ad campaign on $\text{Request}_i$ can be denoted as $r_i = P_r(\text{bid}|\text{Request}_i, \text{Ad})$. The point pacing rate, $r_i$, can be defined by: $r_i \in [0, 1]$ where $w_i = P_r(\text{win}|\text{Request}_i, \text{Ad})$. $w_i$ denotes the probability that the ad campaign wins an auction of $\text{Request}_i$. Using the point pacing rate, a total cost of the ad campaign can be estimated. Such an estimation can be denoted as $C=\Sigma_i r_i \times w_i \times c_i$. $c_i$ denotes the advertiser's cost if the ad campaign is served to $Request_i$. From the estimation of the total cost, estimation of performance can be determined. Such an estimation can be denoted as $P=C/\Sigma_i r_i \times w_i \times p_i$. Performance can be evaluated by parameters such as effective cost per click (eCPC) of the ad campaign. eCPC can also be defined by the cost of a campaign divided by the total number of clicks on ads of the campaign. Effective cost per action (eCPA) can be defined similarly and can be the parameter used to estimate total cost of the campaign and a pacing rate. With respect to control of the total cost, such as through a PID control system, total cost can be denoted as $C=(C^1, \ldots, C^K)$, which is the spending patter over the K time slots where $C^t$ is the cost in the t-th time slot. Given Ad, $\Omega$ can denote an error function inputted into a PID controller. This error function, $\Omega$, can reflect how the spending pattern of C is aligned with the spending plan of the ad campaign budget denoted as B. A smaller value of $\Omega$ indicates a better alignment. $\Omega$ may be defined as an Euclidean distance, such as $\Omega(C, B)=\|C-B\|$.

Additionally or alternatively, the DSP server may also include campaign budgeting circuitry. This circuitry may be configured to receive first online ad campaign information associated with a first campaign. The first campaign information may include a sequence of budgets over a respective sequence of time slots of the first campaign, wherein one of the sequence of budgets includes terms for bidding on a plurality of desired ad responses during a respective time slot. The budgeting circuitry may also be configured to receive second campaign information corresponding to the first campaign information but associated with a second online ad campaign. In such an example, the first campaign occurs subsequent to the second campaign (or at least the first campaign information is received subsequent to the second campaign information). In other words, the second campaign information can be historical information.

The budgeting circuitry can also be configured to: generate budget information for each time slot of the first campaign according to the second campaign information, and determine a total budget for the first campaign according the budget information. This circuitry can also be configured to: determine costs of the first campaign according to the first campaign information; and determine an error function according to at least one difference between the total budget and the costs of the first campaign.

In examples including the budgeting circuitry, the budgeting circuitry can be communicatively coupled to controller circuitry (such as the controller and the pacing control circuitry of the DSP server 116). Such controller circuitry can be configured to: receive output of the error function prior to a given time slot of the first campaign, and adjust pacing of ad impressions of the given time slot, according to the output of the error function. The pacing rate can then be further adjusted by a proportional aspect of the controller, an integral aspect of the controller, a derivative aspect of the controller, or any combination thereof.

In some examples, advertisers may need to simultaneously consider a limited budget, executing spending plan, and improving campaign performance. Such a problem may have various Pareto solutions for prioritizing objectives. For branding campaigns, budget spending may be a top priority followed by aligning with a spending plan. Performance is not a primary concern for such campaigns. Also, for such campaigns at serving time, the $w_i$ and $p_i$ may not be known beforehand. Although, $r_i$ can be initially determined, such as at 306 of FIG. 3. Without specific performance goals, a pacing rate can be denoted as:

$$\min_{r_i} P \text{ s.t. } C = B, \Omega(C, B) \le t \tag{1}$$

where $\epsilon$ defines tolerance on deviating from the spending plan. For performance campaigns where achieving a performance goal is the top priority, sticking to a spending plan is usually a last consideration. For such performance oriented campaigns, the pacing rate can be denoted as:

$$\min_{r_i} \Omega(C, B) \text{ s.t. } P \le G, B - C \le \varepsilon \tag{2}$$

where $\epsilon$ defines the tolerance level for not spending the entire budget.

Given dynamics of marketplaces in a DSP, even single-objective optimization problems are extremely difficult to solve. To tackle this problem, simplifications can be configured into the pacing control system to reduce complexities in pacing control modeling. For example, in CPM oriented campaigns such as certain branding campaigns, the pacing rate can be modeled according to Equation 1. For performance campaigns, the campaign optimization is as defined in Equation 2. In CPC/CPA campaigns, there is an implicit performance goal to guarantee that DSP does not exhaust a budget too quickly and pacing benefits from modeling according to Equation 2. In dynamic CPM campaigns, specific performance goals can be enhanced via modeling using Equation 2. As with CPC/CPA campaigns, such dynamic campaigns benefit from high responding ad requests to reduce the creative serving cost and save ad on ad impressions.

As illustrated by FIG. 4, operations 400 can provide the probability of the desired response per ad request, which can be represented by a performance estimation (such as the estimation of $p_i$). Such an estimation can include the audience, the publisher of content hosting an ad of the campaign, and the advertiser as criteria. The estimation can relax the dependency between an audience member and a publisher according to Equation 3.

$$p_i \alpha \Pr(\text{respond}|\text{Domain}_i, \text{Ad})\Pr(\text{respond}|\text{User}_i, \text{Ad}) \tag{3}$$

The first term of Equation 3, $\Pr(\text{respond}|\text{Domain}_i,\text{Ad})$, can be determined according to a hierarchy, which starts from the root and continues layer after layer at 402 by advertiser category, advertiser, insertion order, line item, and finally ad. Using historical data, a response rate can be assigned to each node in such a hierarchy by aggregating a total number of impressions and clicks/actions of that node's children as a raw estimate. The estimation of the second term $\Pr(\text{respond}|\text{User}_i,\text{Ad})$ at 404, can include features with low cardinality, such as age, gender, geographic location during a desired response, frequency of such a response, and recentness of the response. The estimation of $p_i$ at 406 can use a decision tree model using the estimates outputted from operations 402 and 404. The estimation of $p_i$ at 406 can also use a smoothing piecewise linear regression until a desire level of accuracy in estimation of bid response is achieved.

With the response prediction model, similarly responding ad requests of an ad campaign can be grouped together at 304 of FIG. 3, and such a group can share a group pacing rate determined at 306. The initial estimation of the point pacing rate of each ad request, $r_i$, can be reduced to solving a set of group pacing rates. Once such group pacing rates are determined, the system can fine tune the rates as the campaign processes using a controller such as a PID controller. A group pacing rate is denoted as $r_l$ for the l-th group.

In an example, for each ad campaign, the ad request groups can be organized in layers. This can occur per time slot. The layers can include response rate derived from the response prediction model, priority reflecting preference of a group over other groups, pacing rate, budget, or any combination thereof. In an example, an ad request group can include L layers, and the l-th layer can include a response $rate_l$, $priority_l$, $pacing\ rate_l$, and $spending_l$). Each layer can correspond to a pacing rate, for example, where an upper layer has a pacing rate no slower than a lower layer. When a DSP receives an eligible ad request, it can decide which ad request group the ad request belongs and then can identify a corresponding layer to determine a pacing rate. In such an example, each layer response estimation can be denoted as $p=(p_1, \ldots, p_L)$. Layer pacing rate in a (t-1)-th time slot can be denoted as $r^{t-1}=(r_1^{t-1}, \ldots, r_L^{t-1})$, and layer spending can be denoted as $s^{t-1}=(s_1^{t-1}, \ldots, s_L^{t-1})$. A control system, such as a system including a PID controller, can derive $r^t=(r_1^t, \ldots, r_L^t)$ for the forthcoming t-th time slot according to campaign goals, such as a spending plan and the error function, $\Omega$. For example, the controllers illustrated in FIGS. 9 and 10 can output and feedback $r^t$ into the control system of the DSP.

In an example, the grouping circuitry, the pacing control circuitry, and a controller (such as a PID controller) can be included in the DSP server and can be communicatively couple to perform various operations involved in campaign pacing. Such operation can include receiving, at the grouping circuitry, online ad campaign information, and the campaign information including a sequence of budgets over a respective sequence of time slots of an online ad campaign for at least one ad. The budget of the sequence of budgets includes terms for bidding on a plurality of desired ad responses during a respective time slot of the campaign. The operations can also include determining, by the grouping circuitry, a probability of a given desired ad response of the plurality of desired ad responses. The given response can include an impression of an ad, a click on the ad, or both. The operations can also include repeating, by the grouping circuitry, the determination of the probability of the given response for at least some of the plurality of responses, which results in a plurality of respective probabilities of the plurality of responses. The operations can also include grouping, by the grouping circuitry, the plurality of responses with respect to the plurality of probabilities, which results in a plurality of ad pacing groups. Also, the operation can include determining, by pacing control circuitry, a pacing rate per group of the plurality of ad pacing groups. The pacing control circuitry can also determine an error function that includes a difference between costs of a first time slot and a second time slot of the campaign, and then adjust a pacing rate according to the error function and control aspects of a controller. The control aspects include a proportional aspect, an integral aspect, a derivative aspect, or any combination thereof, such as the control aspects of a PID controller. The error function can delineate alignment between a budget of the ad campaign and a total cost of the ad campaign and can include a Euclidean distance between a budget of the ad campaign and a total cost of the ad campaign. Additionally or alternatively, the operations can include the determining of the pacing rate according to Equations 6, 7, 8, 9, 10, 11, 12, or any combination thereof (which are described in detail below). The determination of the pacing rate according these equations can also include the use controllers such as those illustrated by FIGS. 9 and 10 to adjust the pacing rate.

FIGS. 5 and 6 illustrate respective operations 500 and 600 that can provide adjustments to pacing rates, without and with use of performance goals, respectively. These operations make such adjustments according to Equations 6, 7, 8, 9, 10, 11, 12, or any combination thereof. In such operations, a goal may be to spend an entire budget per slot and align a spending plan with actual ad requests. In other words, exhaust budget and limit the error function, $\Omega$, which can be an input of a controller (such as a PID controller). With an end to each time slot, the DSP may determine budget for a subsequent time slot and an adjusted pacing rate of each layer so that the determined budget is completely spent. A budget can be denoted as B and a spending plan can be denoted as $B=(B^1, \ldots, B^K)$. After running m time slots of a campaign, the remaining budget can be $B_m$. The DSP can determine spending in each of remaining time slots, which can be denoted as $C'^{m+1} \ldots C'^K$, so that the total budget 8 is spent completely as possible and the error function's output is minimized. Equation 4 defines the relationships between $B_m$, $C'^{m+1} \ldots C'^K$, and $\Omega$.

$$\underset{C'^{m+1},\cdots,C'^K}{\mathrm{argmin}}\ \Omega\ \text{s.t.}\ \sum_{t=m+1}^{K} C'^t = B_m \qquad (4)$$

In an example, where $\Omega$ is defined by an Euclidean distance, such as $\Omega(C, B)=\|C-B\|$, these relationships can be defined by Equation 5.

$$\hat{C}^{(t)} = B^{(t)} + \frac{B_m - \sum_{t=m+1}^{K} B^{(t)}}{K-m},\ \text{where}\ t = m+1, \cdots, K \qquad (5)$$

With spending in a preceding time slot denoted as $C'^{t-1}$, a residual cost of a campaign can be denoted as $R=C'^t-C'^{t-1}$.

In FIG. 5 at 502, an aspect of the control system of the DSP can receive $s^{t-1}$, $r^{t-1}$, and R. Where R=0 or R approximately equals 0 at 504, the DSP may continue with the received pacing rate $r^{t-1}$ at 506. Where R<0 or R>0 (or R is below a minimum threshold or exceeds a maximum threshold), which is determined at 508, the control system may adjust the rate at 510 or 512, respectively. At 514, FIG. 5 illustrates the control system using either the output of operation 510 or 512, $r^t=(r_1^t, \ldots, r_L^t)$, to pace ad impressions of the ad campaign through the control system of the DSP.

At 510, pacing rates are adjusted per layer in a top-down fashion with respect to layer priority when R<0 (or R is below a minimum threshold). At 510, the DSP starts with the top layer and works down the layers increasing the pacing rate of each layer to offset R. For example, the DSP starts with a first priority layer and continues with a second priority layer, a third priority layer, and so on, until R=0 or R approximately equals 0. At 510, with each iteration of adjusting the rate at each layer, the control system checks whether R≥0 (or exceeds or is equal to a maximum threshold) and l≠1 (e.g., the given layer exceeds the first priority layer). Where this aforementioned criteria is met, the DSP sets $r^t$ as a trial rate, such as setting the $r^t$ according to Equation 12. Per layer, if R<0 (or is below a minimum threshold), the adjustments to the pacing rates at 510 are made according to Equations 6 and 7.

$$r_l^{(t)} = \max\left(0.0, r_l^{(t-1)} \times \frac{s_l^{(t-1)} + R}{s_l^{(t-1)}}\right) \quad (6)$$

$$R = s_l^{(t-1)} + R \quad (7)$$

At 512, pacing rates, per layer, are adjusted in a bottom-up fashion with respect to layer priority when R>0 (or R exceeds a maximum threshold). At 512, the DSP starts with the bottom layer and works up the layers reducing the pacing rate of each layer to offset R. For example, the DSP starts with a last priority layer and continues with a second-to-last priority layer, a third-to-last priority layer, and so on, until R=0 or R approximately equals 0. At 512, with each iteration of adjusting the rate at each layer, the control system checks whether R≤0 (or is below or is equal to a minimum threshold) and l≠1 (e.g., the given layer exceeds the first priority layer). Where this aforementioned criteria is met, the DSP sets $r^t$ as a trial rate, such as setting the $r^t$ according to Equation 12. Per layer, if R>0 (or exceeds a maximum threshold), the adjustments to the pacing rates at 512 are made according to Equations 8 and 9.

$$r_l^{(t)} = \min\left(1.0, r_l^{(t-1)} \times \frac{s_l^{(t-1)} + R}{s_l^{(t-1)}}\right) \quad (8)$$

$$R = R - s_l^{(t-1)} \times \frac{1.0 - r_l^{(t-1)}}{r_l^{(t-1)}} \quad (9)$$

As illustrated by FIG. 6, operations 600 can provide adjustments to pacing rates per ad request with use of performance goals. The pacing rate adjustment is more complicated for campaigns with performance goals. First, it is difficult to foresee ad request traffic volume in future time slots. Second, it is difficult to forecast the response distribution in the traffic. Considering budget spending constraints, exploiting ad requests in a time slot that meet performance goal may not always be an optimal solution. The DSP can use a heuristic approach that further adjusts pacing rate based on performance goal. This approach can be appended to the pacing rate adjustment provided by operations 500 in FIG. 5. In FIG. 6, a joint performance function, JointPerformance (p, $s^{t-1}$, $r^t$, $r^t$, i), estimates the expected joint performance of layers i, . . . , L.

In FIG. 6, at 602, an aspect of the control system of the DSP can receive $s^{t-1}$, $r^{t-1}$, R, p, and goal. At 604, the aspect can perform the operations of FIG. 5. At 606, using the output of $r^t$ of operation 510 or 512 of FIG. 5, the aspect can determine a joint performance of the layers of the ad campaign, $\hat{p}$. Joint performance can be determined according to Equation 10.

$$\hat{p}=\text{Joint Performance}(p, s^{(t-1)}, r^{(t-1)}, r^{(t)}, 1) \quad (10)$$

At 608, the aspect determines whether the joint performance exceeds the goal. Where the joint performance does not exceed the goal, the DSP may continue with the received pacing rate $r^t$ outputted by the operations 500 at 610. Where the joint performance does exceed the goal, the DSP may continue with adjusting the pacing rate at 612. At 610, FIG. 6 illustrates the control system using either the output of operations 500 or operation 612, $r^t=(r_1^t, \ldots, r_L^t)$, to pace ad impressions of the ad campaign through the control system of the DSP.

At 612, pacing rates, per layer, are adjusted in a top-down fashion, with respect to layer priority, when the joint performance does not exceed the goal at a given layer. Per layer, if the joint performance exceeds the goal then $r_l^t$ is set to zero. Otherwise, $r_l^t$ is set according to Equation 11.

$$r_l^{(t)} = r_l^{(t-1)} \times \frac{\sum_{i=l+1,\ldots,L} s_i^{(t-1)} \times \left(\frac{\text{goal}}{p_i} - 1\right)}{s_l^{(t-1)} \times \left(1 - \frac{\text{goal}}{p_l}\right)} \quad (11)$$

Figure 7A:
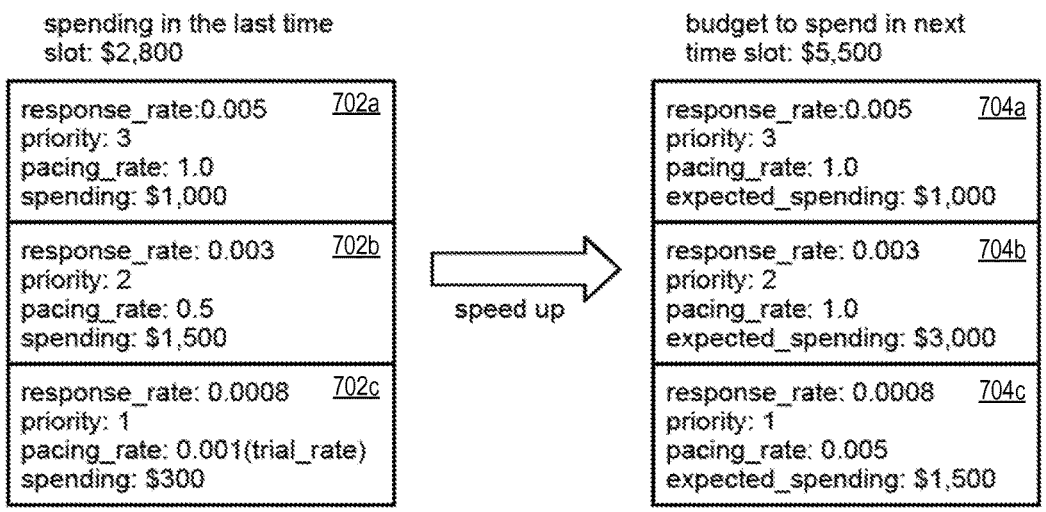
FIG. 7a illustrates an example of a pacing rate increasing for an online ad campaign.
Figure 7B:
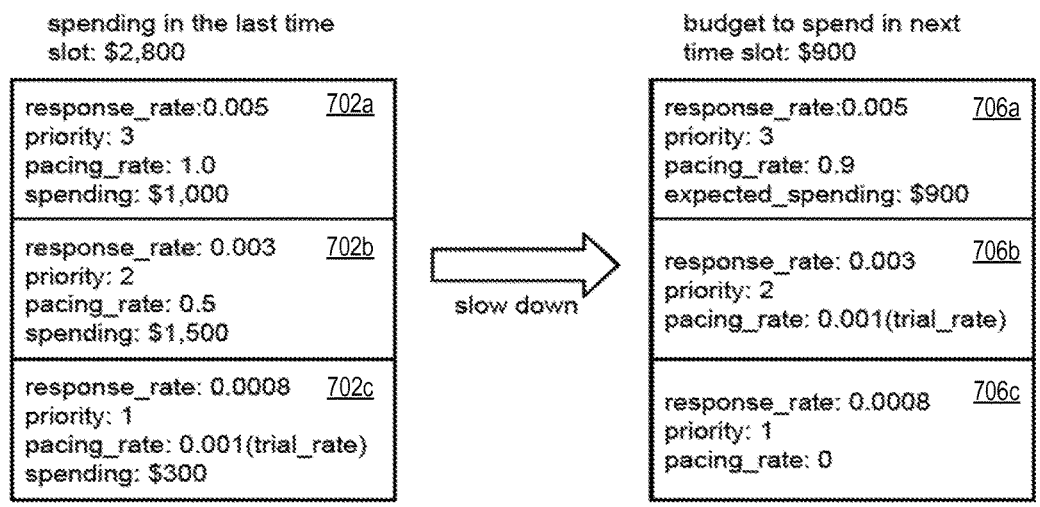
FIG. 7b illustrates an example of a pacing rate decreasing for an online ad campaign.

As illustrated in FIGS. 5 and 6, the layers may be organized so that index L represents the top layer and 1 denotes the bottom layer or the layer adjusted last. A layer adjacent to l, but with a lower priority, may be denoted as l−1 and may be used as the trial layer used to prepare for subsequent rate adjustments. FIG. 7a illustrates an example of the pacing rate increasing for a campaign, such as where R>0. FIG. 7b gives an example of the pacing rate decreasing for a campaign, such as where R<0. FIGS. 7a and 7b also illustrate the layering of an ad campaign described herein. Layers 702a, 702b, and 702c denote groups of ad responses in an ad campaign that have response rates of 0.5%, 0.3%, and 0.08%, respectively. The rates could represent the rates of clicks per impression of one or more ads of a campaign at different impression locations and/or contexts. The layer with the highest response rate is selected to have a highest priority, denoted by "3", which is layer 702a. This layer has a pacing rate of 100%, so in an impression model, every time the ad spot requests an ad from the group such an ad is displayed. In layer 702b, the pacing rate is 50%, so in an impression model, every time the ad spot requests an ad from the group, such an ad is only displayed half of the time. The pacing rate for layer 702c is 0.1%, which may be used as a trial rate. Each of these layers also includes an amount spent in the last time slot (e.g., the (t−1)-th time slot). The layers 704a, 704b, and 704c, illustrate the expected estimated amount of spending if the pacing rate increased overall for the campaign. In this case, the pacing rate has been increased at layers 704b and 704c. FIG. 7b illustrates the effect of lowering the pacing rates. The layers 706a, 706b, and 706c, illustrate the expected estimated amount of spending if the pacing rate decreases overall for the campaign. In this case, in an impression model, the impressions of layer 706c are not shown in the next time slot (e.g., the t-th time slot).

For a new campaign, we identify the most similar existing ad campaign(s) and estimate a proper global pacing rate $r_G$ so that its budget can be spent out, and set the number of layers L=[1/$r_G$]. This $r_G$ can be used as a default rate for the initial pacing rate at operation 306 of FIG. 3. As a number of layers increases the output of the error function, Ω, has been shown to decrease. However, there are tradeoffs to increasing the number of layers. Statistics outputted from each layer are less significant as the amount of layers is increased. Also, memory consumption is increased with an increase in layers.

In an example, once the number of layers is determined, the campaign can run with the global pacing rate $r_G$ in the first time slot (or at the initialization phase), in which the response rate distribution and delivery pattern are collected by the DSP. To identify the layer boundaries, ad requests are grouped evenly into the desired number of layers based on their predicted response rate. In a subsequent time slot, the pacing rates are reassigned, so that highest responding layer(s) have rates of 1.0 while lowest have a rate of 0.0. The trial rate (such as either one of the trial rates illustrated in FIGS. 5 and 6) should be low. The trial rate can be used to collect delivery data to prepare the DSP for subsequent increases to the pacing rate. The trial rate can be derived by reserving a certain portion, A, of the campaign budget to be spent by a trial layer. Also, the DSP can use historical spending and pacing rates of past trial layers of other campaigns, such as spending and pacing rates from at least one time slot like an initial phase. The trial pacing rate can be estimated according to Equation 12.

$$\text{trial\_rate} = \text{pacing\_rate}_{hist} \frac{\lambda \times \text{spending}_{plan}}{\text{spending}_{hist}} \quad (12)$$

In Equation 12, spending$_{hist}$ and pacing rate$_{hist}$ are the historical spending and the historical pacing rate of the trial layer, respectively.

Pacing control for online advertising can include mechanisms for rapid feedback of layered statistics and overspending prevention. The DSP can use a message queue and/or a remote procedure call (RPC) to enhance feedback. A message queue can communicate messages from impression servers to an in-memory data source. Messages can also be derived from analytics (such analytics output from the analytics server 118 illustrated in FIG. 1). An impression rate could be very high (e.g., billions of impressions per day), so the asynchronous nature of a message queue enables high throughput and low latency. The DSP can use RPC to send pacing rates and related notifications to advertisers bidding on impression opportunities. Resources can also be conserved through batch processing and microaggregation. A batch can accumulate hundreds of delivery messages into a single request to reduce the network overhead. A batch can also group multiple small I/O operations (such I/O operations between the servers of FIG. 1) into a single I/O operation. Microaggregation can include the generation of data sub-sets from the data, such as data from a batch process, and averaging or taking a centroid of each subset and replacing the original data in that subset. This can reduce data demands on memory and network communications. Also, the DSP can use an in-memory data source to store the layered statistics of each campaign. In examples, using a message queue, the queue can be used as a commit log. In such an example, the queue must adhere to its initial message sequence. Data representing the message sequence can be used as input to recover data where the queue or the in-memory data source fail due to memory data loss or limit in memory. Aggregation can also be used to avoid such issues. In an example, pacing rate adjustment can be based on a most recent time slot so only messages for such slots is stored in memory, and the historical data can be stored in an aggregated form to reduce the memory usage. For example, the historical data can be stored in a microaggregation form.

FIG. 8 is block diagram of example electronic device, such as a server, that can implement aspects of an example DSP that includes ad campaign pacing control system, such as DSP Server 116. The control system can include a controller and a controller interface that bridges the controller and the DSP (such as controller interface 827 and controller 828). The controller 828 can include a proportional aspect, an integral aspect, a derivative aspect, or any combination thereof (such as the PID controller 902 of FIG. 9 or a PI controller 1002 of FIG. 10).

The electronic device 800 can include a CPU 802, memory 810, a power supply 806, and input/output components, such as network interfaces 830 and input/output interfaces 840, and a communication bus 804 that connects the aforementioned elements of the electronic device. The network interfaces 830 can include a receiver and a transmitter (or a transceiver), and an antenna for wireless communications. The network interfaces 830 can also include at least part of the interface circuitry 816. The CPU 802 can be any type of data processing device, such as a central processing unit (CPU). Also, for example, the CPU 802 can be central processing logic.

The memory 810, which can include random access memory (RAM) 812 or read-only memory (ROM) 814, can be enabled by memory devices. The RAM 812 can store data and instructions defining an operating system 821, data storage 824, and applications 822, such as applications implemented through hardware including the DSP 826, the controller interface 827, the controller 828, and the grouping circuitry 829. The applications 822 may include hardware (such as circuitry and/or microprocessors), firmware, software, or any combination thereof. The ROM 814 can include basic input/output system (BIOS) 815 of the electronic device 800. The memory 810 may include a non-transitory medium executable by the CPU.

The power supply 806 contains power components, and facilitates supply and management of power to the electronic device 800. The input/output components can include at least part of the interface circuitry 816 for facilitating communication between any components of the electronic device 800, components of external devices (such as components of other devices of the information system 100), and end users. For example, such components can include a network card that is an integration of a receiver, a transmitter, and I/O interfaces, such as input/output interfaces 840. The I/O components, such as I/O interfaces 840, can include user interfaces such as monitors, keyboards, touchscreens, microphones, and speakers. Further, some of the I/O components, such as I/O interfaces 840, and the bus 804 can facilitate communication between components of the electronic device 800, and can ease processing performed by the CPU 802.

The electronic device 800 can send and receive signals, such as via a wired or wireless network, or may be capable of processing or storing signals, such as in memory as physical memory states, and may, therefore, operate as a server. The device 800 can include a single server, dedicated rack-mounted servers, desktop computers, laptop computers, set top boxes, integrated devices combining various features, such as two or more features of the foregoing devices, or the like.

Figure 9:
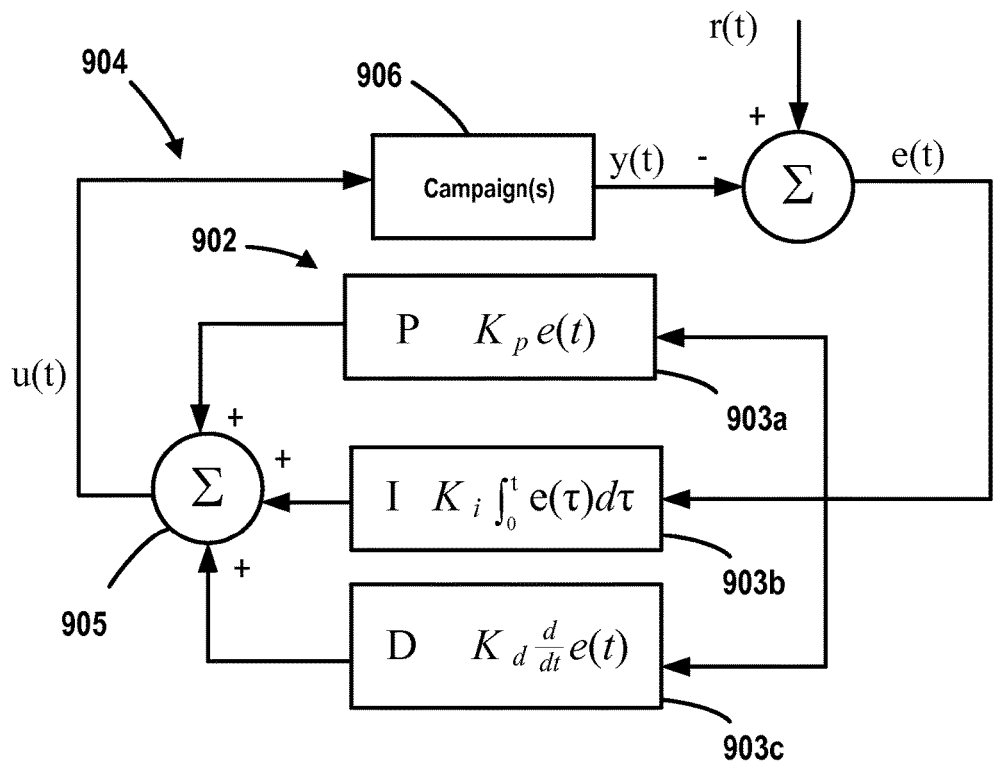
FIG. 9 illustrates a block diagram of an example PID controller within an example control system (such as the control system within the DSP server 116 illustrated in FIG. 1).

FIG. 9 illustrates a block diagram of an example PID controller 902 (such as controller 828) within an example feedback loop 904 within an example control system (such as the pacing control system within DSP server 116). The PID controller 902, and any other controller or aspect described herein, may be implemented via circuitry, such as electronic circuitry. Interfaces to the controller 902 (such as controller interface 827) may be made accessible to analytics circuitry (such as gain coefficient tuning circuitry) or parts of the DSP.

An interface of the PID controller 902 may include inputs that can be used to calculate an error variable e(t), such as the output of error function, Ω, which may represent some form of a difference between a measured process variable y(t), such as spending pattern C, and a goal variable r(t), such as ad campaign budget B. One task of the PID controller 902 can be to reduce the error value by adjusting inputs of the controlled process. The rate of reduction depends on the controller's settings, such as the values of gain coefficients $K_p$, $K_i$, and $K_d$ corresponding to the proportional aspect 903a, the integral aspect 903b, and the derivative aspect 903c of the PID controller. The gain coefficients $K_p$, $K_i$, and $K_d$ may be associated with one or more controllable aspects of a campaign, such as layer amounts, layer prioritization, and layer spending.

The proportional aspect 903a of the PID controller 902 may relate to real-time error, the integral aspect 903b may relate to an accumulation of past errors, and the derivative aspect 903c may be a prediction of future errors based at least on rate of change in the error value. Additionally or alternatively, besides continuous correction and the integral form of the integral aspect 903b, the system may use a time period-based time scale and a summation 905 of the aspects 903a-903c (such as a weighted summation of these three aspects) to adjust one or more variables of one or more online advertising campaigns 906.

The PID controller 902 can be useful in directing adjustments to online campaigns, especially complex campaigns taking advantage of multiple online advertising channels, because time-consuming modelling and analysis are not needed to effectively tune such campaigns. By merely designing an error function e(t) and setting gain coefficients of the PID controller 902 (such as any one or more of the gain coefficients $K_p$, $K_i$, and $K_d$), the controller can provide direction according to process specifications. In an example, a result of the PID controller 902 can include a degree of responsiveness to an error, a degree to which the controller overshoots a pre-defined goal, and a degree of system oscillation.

Figure 10:
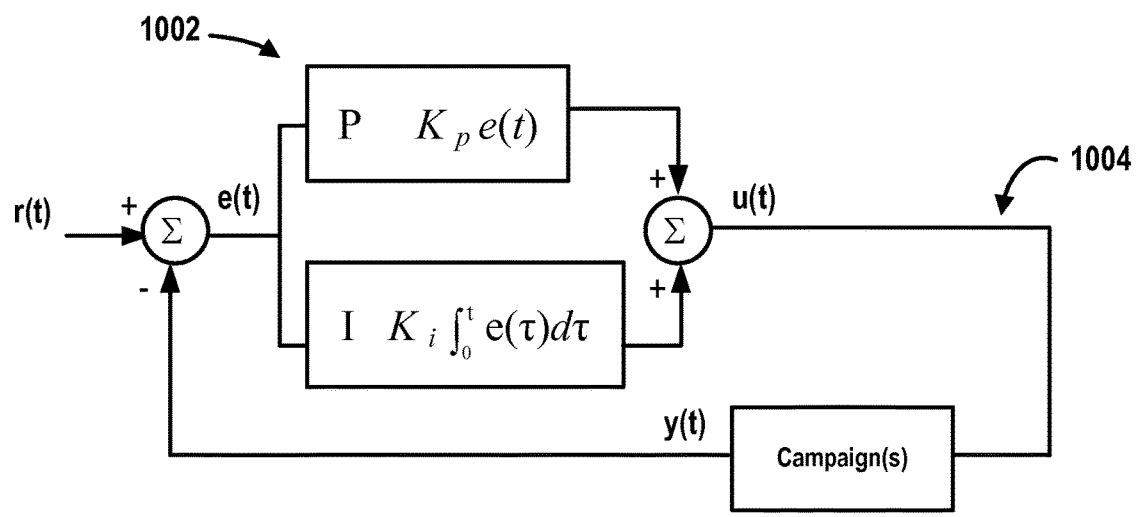
FIG. 10 illustrates a block diagram of an example PI controller within an example control system (such as the control system within the DSP server 116 illustrated in FIG. 1).

As exemplified, in FIG. 10, some examples of a PID controller may only use one or two of the aspects 903a-903c. This can occur by setting one or two of the aspects 903a-903c to zero. Where each of the three aspects 903a-903c is implemented by circuitry, one or two of the aspects may be removed. For example, circuitry implementing the PI controller 1002 may only include circuitry for proportional and integral aspects. Alternatively, circuitry implementing the PI controller 1002 may include circuitry for all the aspects of a PID controller, but the derivative aspect is set to output zero, voided, or switched off. PI controllers are useful, since derivative action can be sensitive to noise, whereas the absence of the integral aspect may prevent a controlled campaign from reaching or even approaching its pre-defined goal.

In an example, a control loop directed by the PID controller 902 can manually and/or automatically adjust parameters of an online advertising campaign to achieve or at least approach pre-defined goals of the campaign. Results of a campaign to compare against the pre-defined goals may include analytics, such as any of the analytics described with respect to FIGS. 1 and 2. Results of a campaign to compare against the pre-defined goals may also include data from logs, such as of the data logs described with respect to FIGS. 1 and 2. The measured process variable y(t) may include the results of a campaign to be compared against the pre-defined goals that may be included in the goal variable r(t). The pre-defined goals can include one or more set points. The controlled input variable of the u(t), such as the pacing rate, r′, which can be the output of the PID controller 902 may be referred to as manipulated variables or controlled variables, since such parameters are controlled by the PID controller.

A difference between the y(t) and the r(t) is an error variable e(t), which may be an error value or an error function. Also, each of the variables y(t), r(t), u(t), and e(t) can be a value, a set of values, a function, a set of functions, or any combination thereof. The e(t) quantifies whether the campaign is meeting its pre-defined goals and the extent that it is meeting the goals. As illustrated in FIG. 9, the PID controller 902 determines the u(t) according to the e(t) and the proportional aspect 903a, the integral aspect 903b, the derivative aspect 903c, or any combination thereof.

In an example, the proportional aspect 903a is set in proportion to the e(t). The derivative aspect 903c uses a rate of change in the y(t). The integral aspect 903b uses an average and/or accumulated y(t) from the past. An alternative of integral aspect 903b can use change of the u(t) in steps proportional to the e(t). Over time, the steps add up the past errors (which is a discrete time equivalent to integration).

In adjusting any of the three aspects 903a-903c (such as by adjusting the $K_p$, $K_i$, and/or $K_d$), a change that is too large when the error is small may lead to overshoot. Where the PID controller 902 repeatedly makes changes that are too large and overshoot the r(t), output of the PID controller (such as u(t)) may oscillate around one or more of the set points in either a constant, growing, or a decaying sinusoid. In examples wherein the amplitude of the oscillations increases with time (i.e., the sinusoid is growing) the campaign is unstable. If the amplitude of the oscillations decreases, the campaign is stable. If the oscillations remain at a constant amplitude, the campaign is marginally stable.

In an example, the PID controller 902 may dampen anticipated future oscillations by tempering its adjustments, or reducing a controller gain. This may cause a gradual convergence towards the r(t). If the PID controller 902 starts from a stable state with zero error (e.g., y(t)=r(t)), then adjustments to the controller can be in response to changes in other measured or set inputs to the campaign that affect the campaign, and hence the y(t). Variables that affect the campaign other than the u(t) are known as disturbances. The PID controller 902 may reject disturbances.

As mentioned herein, the PID controller 902 can output manipulated variables, such as the u(t), according to the summation 905 of the aspects 903a-903c. For example:

$$u(t) = K_p e(t) + K_i \int_0^t e(\tau) d\tau + K_d \frac{d}{dt} e(t)$$

where:
  $K_p$ is proportional gain coefficient;
  $K_i$ is integral gain coefficient;
  $K_d$ is derivative gain coefficient;
  e(t) is error at a given time (e.g., y(t)−r(t));
  t is the given time; and
  τ is variable of integration representative of an initial time to the given time.

The proportional aspect 903a can generate and output a value that is proportional to the error in real time. The output of the proportional aspect can be adjusted by multiplying the error in real time by the gain coefficient $K_p$, also referred to as the proportional gain constant. The proportional aspect can be algorithmically defined by:

$$P_{out} = K_p e(t)$$

A relatively high proportional gain can result in a large change in u(t) for a given change in the e(t). As mentioned herein, if the proportional gain is too high, the system can become unstable. A relatively small gain can result in a small change in u(t) for a given change in e(t), and a less responsive controller. If the proportional gain is too low, the response by the PID controller 902 may be too small in response to disturbances. The proportional aspect 903a can be weighted to have a greater effect on u(t) than the other two aspects 903b and 903c.

The contribution from the integral term can be proportional to a magnitude of the error and/or duration of the error. The integral aspect 903b can include a summation of error over time and can provide an accumulated offset to the proportional aspect 903a. The accumulated error can be multiplied by an integral gain, such as the gain coefficient $K_i$, and added to the output of the PID controller 902. The integral aspect can be algorithmically defined by:

$$I_{out} = K_i \int_0^t e(\tau) d\tau$$

The integral aspect 903b can accelerate the direction of the campaign towards r(t) and can reduce a residual steady state error that can occur with a controller with just an operating proportional aspect. A tradeoff to this acceleration can include y(t) overshooting r(t).

The derivative aspect 903c can determine a derivative of the process error in real time by determining the slope of the error over time and multiplying this rate of change by a derivative gain, such as the gain coefficient $K_d$. The derivative aspect 903c can be set at zero or weighted to have a lower effect on u(t) than the other two aspects 903a and 903b. The derivative aspect can be algorithmically defined by:

$$D_{out} = K_d \frac{d}{dt} e(t)$$

The derivative aspect 903c can provide a prediction on future campaign behavior and the PID controller 902 can use that prediction to improve settling time and stability of the campaign. In an example where the derivative aspect 903c is used, the PID controller 902 can include a low pass filter associated with the derivative aspect. The low pass filter can limit the high frequency gain and noise that obfuscate the output of the derivative aspect 903c.

Referring to FIG. 10, this figure illustrates a block diagram of an example PI controller 1002 within an example feedback loop 1004 within an example control system (such as the control system within the DSP server 116). The PI Controller 1002 is an example PID controller that has switched off a derivative aspect, set the derivative aspect to zero, or completely removed the derivative aspect from the controller's circuitry. The PI controller 1002 can be algorithmically defined by:

$$K_P \Delta + K_I \int \Delta(dt)$$

where Δ is the difference between a measured value y(t) and a set point r(t), Δ=r(t)−y(t) or a multi-dimensional function e(t) of similar nature in case of multiple goal metrics for an ad campaign.

A PI controller can be modeled using Laplace operators, such as:

$$C = \frac{G(1 + \tau s)}{\tau s}, \text{ where}$$

-continued $$G = K_P,$$

$$G/\tau = K_I.$$

Variable G can be set in the PI controller 1002 to control a control tradeoff, such as overshoot versus settling time. By not including a derivative aspect, a state of a given campaign may remain steadier. Noise can destabilize a process controlled by a controller using a derivative aspect, especially when the noise is significant. In the case of a complex campaign, the noise found in analytics and data logs can be significant. Because the PI controller 1002 lacks a derivative aspect, it may be less responsive to the dynamic nature of a sophisticated, ever-changing, and fast-paced online ad campaign. In such an example, the campaign may take longer to reach or at least acceptably approach r(t).

The invention claimed is:

1. A system, comprising:
   grouping circuitry, configured to:
      receive online ad campaign information, and the campaign information including a sequence of budgets over a respective sequence of time slots of an online ad campaign for at least one ad, a budget of the sequence of budgets including terms for bidding on a plurality of desired ad responses during a respective time slot of the campaign;
      determine a probability of a given desired ad response of the plurality of desired ad responses according to:
         $p_i = \Pr(\text{respond}/\text{Request}_i, \text{Ad})$,
         wherein $p_i$ is the probability,
         wherein $P_r$ is a probability function,
         wherein respond is the given desired ad response,
         wherein $\text{Request}_i$ is an i-th ad request received by a demand side platform, and
         wherein Ad is the campaign,
            the given response including an impression of an ad, a click on the ad, or both;
      repeat the determination of the probability of the given response for at least some of the plurality of responses, resulting in a plurality of respective probabilities of the plurality of responses; and
      group the plurality of responses with respect to the plurality of probabilities, resulting in a plurality of ad pacing groups; and
   pacing control circuitry of the demand side platform, configured to:
      determine a pacing rate per group of the plurality of ad pacing groups; and
      adjust the pacing rate, according to a difference between costs of a first time slot and a second time slot of the campaign.

2. A system, comprising:
   grouping circuitry, configured to:
      receive online ad campaign information, and the campaign information including a sequence of budgets over a respective sequence of time slots of an online ad campaign for at least one ad, a budget of the sequence of budgets including terms for bidding on a plurality of desired ad responses during a respective time slot of the campaign;
      determine a probability $p_i \alpha \Pr(\text{respond}/\text{Domain}_i, \text{Ad})\Pr(\text{respond}/\text{User}_i, \text{Ad})$, of a given desired ad response of the plurality of desired ad responses, the given response including an impression of an ad, a click on the ad, or both;

wherein $p_i$ is the probability,
wherein $P_r$ is a probability function,
wherein respond is the given desired ad response,
wherein $Domain_i$ is an i-th online property displaying the at least one ad,
wherein $User_i$ is an i-th audience member viewing the at least one ad, and
wherein Ad is the campaign;
repeat the determination of the probability of the given response for at least some of the plurality of responses, resulting in a plurality of respective probabilities of the plurality of responses; and
group the plurality of responses with respect to the plurality of probabilities, resulting in a plurality of ad pacing groups; and
pacing control circuitry, configured to:
determine a pacing rate per group of the plurality of ad pacing groups; and
adjust the pacing rate, according to a difference between costs of a first time slot and a second time slot of the campaign.

3. The system of claim 2, wherein the grouping circuitry is further configured to determine the $Pr(respond/Domain_i, Ad)$ according to a hierarchy that includes a root and descendants starting with advertiser categories, followed by advertisers, then insertion orders, then line items, and then ads.

4. The system of claim 2, wherein the grouping circuitry is further configured to determine the $Pr(respond/User_i, Ad)$, according to demographics of the audience member, a geographic location of the audience member during a desired response, frequency of the desired response, recentness of the desired response, or any combination thereof.

5. The system of claim 2, wherein the grouping circuitry is further configured to determine the probability of the given desired ad response according to a decision tree.

6. The system of claim 2, wherein the grouping circuitry is further configured to determine the probability of the given desired ad response according to smoothing piecewise linear regression.

7. A system, comprising:
grouping circuitry, configured to:
receive online ad campaign information, and the campaign information including a sequence of budgets over a respective sequence of time slots of an online ad campaign for at least one ad, a budget of the sequence of budgets including terms for bidding on a plurality of desired ad responses during a respective time slot of the campaign;
determine a probability of a given desired ad response of the plurality of desired ad responses, the given response including an impression of an ad, a click on the ad, or both;
repeat the determination of the probability of the given response for at least some of the plurality of responses, resulting in a plurality of respective probabilities of the plurality of responses; and
group the plurality of responses with respect to the plurality of probabilities, resulting in a plurality of ad pacing groups; and
pacing control circuitry, configured to:
determine a pacing rate per group of the plurality of ad pacing groups according to:

$$r_i = P_r(bid/Request_i, Ad),$$

wherein $r_i \in [0, 1]$,
wherein $P_r$ is a probability function,
wherein $Request_i$ is an i-th ad request received by a demand side platform that includes the pacing control circuitry,
wherein bid is a bid on the $Request_i$, and
wherein Ad is the campaign; and
adjust the pacing rate, according to a difference between costs of a first time slot and a second time slot of the campaign.

8. The system of claim 7, wherein the pacing control circuitry is further configured to determine the pacing rate according to historical information.

9. The system of claim 8, wherein the historical information includes analytics.

10. The system of claim 1, wherein the grouping circuitry is further configured to organize the plurality of ad pacing groups immediately prior to each time slot of the campaign.

11. The system of claim 1, wherein the grouping circuitry is further configured to organize the plurality of ad pacing groups by the plurality of respective probabilities of the plurality of desired ad responses, a plurality of priorities reflecting preferences between groups of the plurality of ad pacing groups, pacing rates, spending, or any combination thereof.

12. A method, comprising:
receiving, at grouping circuitry, online ad campaign information, and the campaign information including a sequence of budgets over a respective sequence of time slots of an online ad campaign for at least one ad, a budget of the sequence of budgets including terms for bidding on a plurality of desired ad responses during a respective time slot of the campaign;
determining, by the grouping circuitry, a probability of a given desired ad response of the plurality of desired ad responses, the given response including an impression of an ad, a click on the ad, or both;
repeating, by the grouping circuitry, the determination of the probability of the given response for at least some of the plurality of responses, resulting in a plurality of respective probabilities of the plurality of responses;
grouping, by the grouping circuitry, the plurality of responses with respect to the plurality of probabilities, resulting in a plurality of ad pacing groups;
determining, by pacing control circuitry, a pacing rate per group of the plurality of ad pacing groups according to:

$$r_i = P_r(bid/Request_i, Ad),$$

wherein $r_i \in [0, 1]$,
wherein $P_r$ is a probability function,
wherein $Request_i$ is an i-th ad request received by a demand side platform that includes the pacing circuitry,
wherein bid is a bid on the $Request_i$, and
wherein Ad is the campaign;
determining, by the pacing control circuitry, an error function that includes a difference between costs of a first time slot and a second time slot of the campaign; and
adjusting, by a controller, pacing rate according to the error function and control aspects of a controller, wherein the control aspects include a proportional aspect, an integral aspect, a derivative aspect, or any combination thereof.

13. The method of claim 12, wherein the error function delineates alignment between a budget of the ad campaign and a total cost of the ad campaign.

14. The method of claim 12, wherein the error function is a Euclidean distance between a budget of the ad campaign and a total cost of the ad campaign.

15. A method, comprising:
receiving, at grouping circuitry, online ad campaign information, and the campaign information including a sequence of budgets over a respective sequence of time slots of an online ad campaign for at least one ad, a budget of the sequence of budgets including terms for bidding on a plurality of desired ad responses during a respective time slot of the campaign;

determining, by the grouping circuitry, a probability of a given desired ad response of the plurality of desired ad responses, the given response including an impression of an ad, a click on the ad, or both;

repeating, by the grouping circuitry, the determination of the probability of the given response for at least some of the plurality of responses, resulting in a plurality of respective probabilities of the plurality of responses;

grouping, by the grouping circuitry, the plurality of responses with respect to the plurality of probabilities, resulting in a plurality of ad pacing groups;

determining, by pacing control circuitry, a pacing rate per group of the plurality of ad pacing groups according to $$r_l^{(t)} = \max\left(0.0, r_l^{(t-1)} \times \frac{s_l^{(t-1)} + R}{s_l^{(t-1)}}\right)$$

$$R = s_l^{(t-1)} + R, \text{ or}$$

$$r_l^{(t)} = \min\left(1.0, r_l^{(t-1)} \times \frac{s_l^{(t-1)} + R}{s_l^{(t-1)}}\right)$$

$$R = R - s_l^{(t-1)} \times \frac{1.0 - r_l^{(t-1)}}{r_l^{(t-1)}},$$

wherein $r_l^t$ is a pacing rate for a layer of the campaign in a (t−1)-th time slot, wherein $r_l^{t-1}$ is a pacing rate for a layer of the campaign in a t-th time slot, wherein $s_l^{t-1}$ is an amount spent for a layer of the campaign in the (t−1)-th time slot, and wherein R is residual cost of the campaign between the (t−1)-th time slot and the t-th time slot;

determining, by the pacing control circuitry, an error function that includes a difference between costs of a first time slot and a second time slot of the campaign; and adjusting, by a controller, pacing rate according to the error function and control aspects of a controller, wherein the control aspects include a proportional aspect, an integral aspect, a derivative aspect, or any combination thereof.

* * * * *